(12) United States Patent
Holm

(10) Patent No.: US 12,329,078 B2
(45) Date of Patent: Jun. 17, 2025

(54) AQUAPONIC SYSTEM AND ENCLOSURE

(71) Applicant: William Holm, Apple Valley, UT (US)

(72) Inventor: William Holm, Apple Valley, UT (US)

( * ) Notice: Subject to any disclaimer, the term of this patent is extended or adjusted under 35 U.S.C. 154(b) by 0 days.

(21) Appl. No.: 18/640,995

(22) Filed: Apr. 19, 2024

(65) Prior Publication Data

US 2024/0349668 A1  Oct. 24, 2024

Related U.S. Application Data

(60) Provisional application No. 63/593,667, filed on Oct. 27, 2023, provisional application No. 63/497,442, filed on Apr. 21, 2023.

(51) Int. Cl.
*A01G 31/02* (2006.01)
*A01K 63/04* (2006.01)

(52) U.S. Cl.
CPC ............ *A01G 31/02* (2013.01); *A01K 63/045* (2013.01); *A01G 31/065* (2025.01)

(58) Field of Classification Search
CPC .... A01G 31/02; A01K 63/003; A01K 63/047; A01K 61/00; A01K 63/04
See application file for complete search history.

(56) References Cited

U.S. PATENT DOCUMENTS

| | | | |
|---|---|---|---|
| 6,447,681 B1 * | 9/2002 | Carlberg | C02F 3/327 210/219 |
| 8,677,686 B1 | 3/2014 | Nelson et al. | |
| 9,232,792 B2 | 1/2016 | Nelson et al. | |
| 2019/0141964 A1 * | 5/2019 | Perslow | A01K 63/06 119/211 |
| 2020/0344966 A1 * | 11/2020 | Lefers | A01K 63/047 |
| 2024/0166541 A1 * | 5/2024 | Nussinovitch | C02F 3/085 |

FOREIGN PATENT DOCUMENTS

| | | | | |
|---|---|---|---|---|
| KR | 101316365 B1 * | 10/2010 | | A01K 63/04 |
| WO | WO-03086066 A1 * | 10/2003 | | A01K 63/04 |
| WO | WO-2017026899 A1 * | 2/2017 | | A01K 61/00 |
| WO | WO-2019160449 A2 * | 8/2019 | | A01K 63/04 |

* cited by examiner

*Primary Examiner* — Monica L Perry

(57) ABSTRACT

An aquaponic system comprises a growing enclosure having a roof and first second transparent parallel perimeter walls. A controller may energize a motor-driven spindle above and between the perimeter walls to raise or lower wound sheets of reflective material to control sunlight admitted into the enclosure. A fish tank within the enclosure contains fluid and fish and a drain outlet leading to a sludge separator. Sludge is processed through a series of biofilter tanks to produce a nutrient fluid irrigated onto plants growing in bed tubes arrayed in cylindrical grow towers. Tubs beneath the grow towers contain nutrient soil and other organisms. Several closed loops of pumped fluid flows circulate nutrient fluids among the fish tank, sludge tank, biofilter tanks, and irrigation lines for the grow towers. Flow restrictors balance these flow loops. Vortex oxygenators at points along the flow loops mix air into the circulating nutrient fluids.

17 Claims, 11 Drawing Sheets

A-A

A-A
DETAIL 5d

K-K

B - B

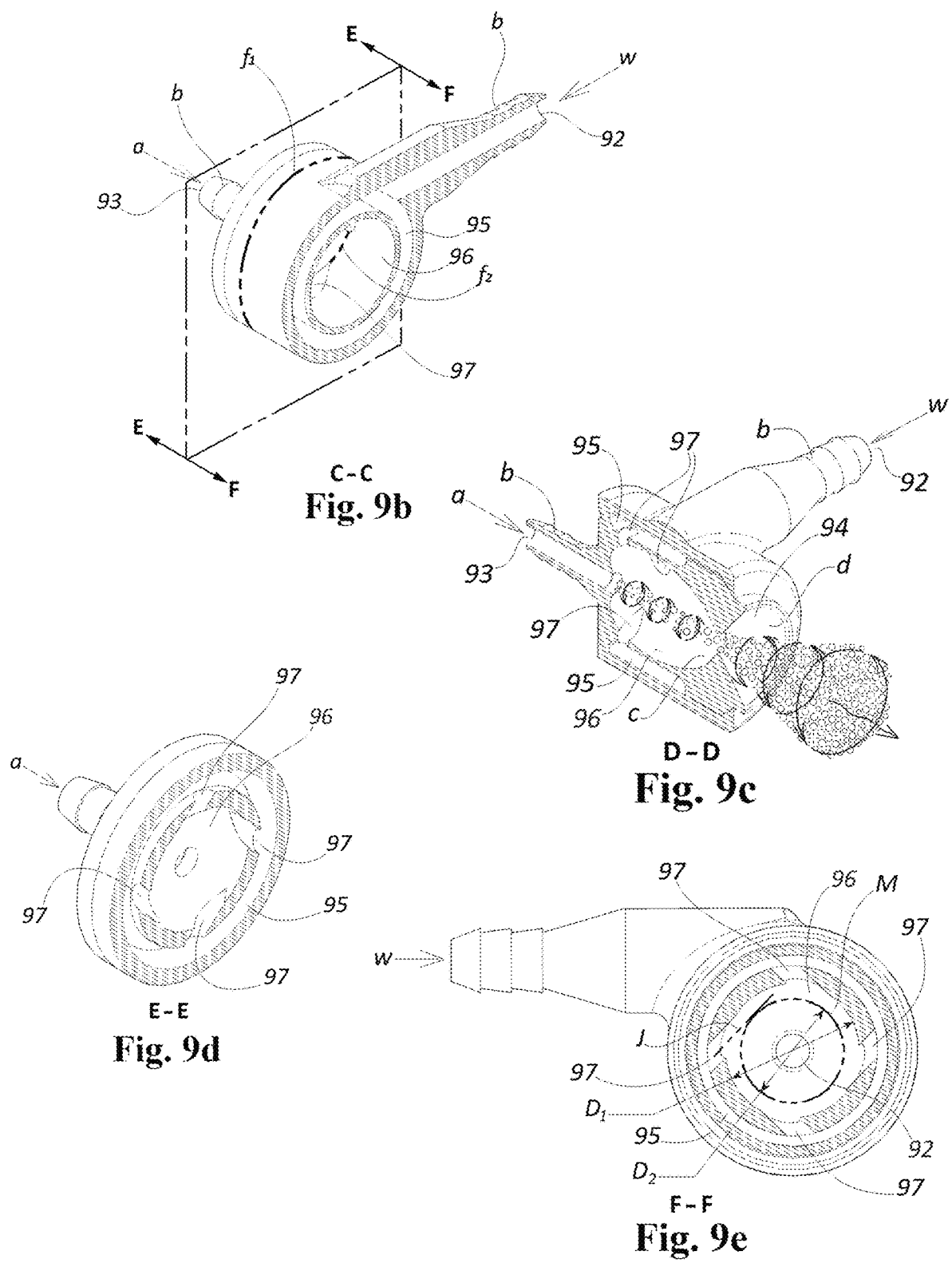

G-G

H-H

J-J

K-K

AQUAPONIC SYSTEM AND ENCLOSURE

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

CROSS REFERENCE TO RELATED APPLICATION

This US non-provisional utility application claims the benefit of and priority to U.S. provisional application Ser. No. 63/497,442 "Aquaponic System and Enclosure," filed 21 Apr. 2023, and U.S. provisional application Ser. No. 63/593,667 "Aquaponic System and Enclosure," filed 27 Oct. 2023, with both of these provisional applications currently pending at this time.

The entire contents of U.S. provisional application Ser. No. 63/497,442 "Aquaponic System and Enclosure," filed 21 Apr. 2023, and U.S. provisional application Ser. No. 63/593,667 "Aquaponic System and Enclosure," filed 27 Oct. 2023 are hereby incorporated into this document by reference.

FIELD

The invention relates to an enclosure for protecting an aquaponic system which provides a substantially complete, self-contained, and sustainable closed-loop nutrient-rich environment for producing edible plants, animals, and other useful materials for human survival and other nutrient needs.

BACKGROUND

The ability to produce one's own foods, whether staple goods or specialties such as herbs and spices, is to many a personally satisfying achievement and may be a partially, substantially, or completely liberating experience enabling individuals, families, or communities independent from supermarket chains, large food distribu-tion conglomerates, and large scale agricultural firms.

Growing one's own produce or specialty products, and raising one's own animals for slaughter remands control to individuals and families as to what is and is not added into the foods they choose to eat, and grants independence to the people from unknown or unwanted chemical additives, artificially engineered food products, waves of price inflation or other extraneous pressures to conform to various political, environmentalist, or globalist agendas.

Also, enclosures for gardening may be climate and humidity controlled so as to allow plants adapted to certain climates to grow in areas having other climates.

BRIEF DESCRIPTION

A primary objective of the invention is to provide an enclosure capable of sustaining plant life supported by other organisms such as fish and worms so that the digestive systems of the animals concentrate nitrates, nitrites, and other organic compounds beneficial to the plants grown in the enclosure.

Another objective of the invention is to provide automated means for controlling sunlight admitted into the enclosure. A corollary objective of the invention is to provide means for temperature and humidity control of the growing environment within the enclosure.

Another objective of the invention is to provide an enclosure which is portable for delivery to customers. A corollary objective of the invention is to provide an aquaponic growing enclosure large enough to produce a copious amount of edible plant products in a limited size amenable for people who live on small-sized property lots.

BRIEF DESCRIPTION OF THE DRAWINGS

A further understanding of the nature and advantages of particular embodiments may be realized by reference to the remaining portions of the specification and the drawings, in which like reference numerals are used to refer to similar components. When reference is made to a reference numeral without specification to an existing sub-label, it is intended to refer to all such multiple similar components.

FIG. 6b shows an exploded, oblique front left top view of components of the fish tank of FIG. 6a.

FIG. 8c shows an oblique view of a cut-away of a smaller diameter grow tower of the grow tower modular assembly of FIG. 8a.

FIG. 9b shows an oblique cross section view of the vortex oxygenator of FIG. 9a taken at cutting plane C-C seen in FIG. 9a, and defines another parallel cutting plane passing through a midplane of a vortex inducing chamber of this component which is used for cross section view E-E of FIG. 9d and cross section view F-F of FIG. 9e.

FIG. 9c shows an oblique cross section view of the vortex oxygenator of FIG. 9a taken at cutting plane D-D seen in FIG. 9a.

FIG. 9d shows an oblique cross section view of the vortex oxygenator of FIG. 9a taken at the cutting plane of FIG. 9b corresponding to a view direction defined by arrows E-E of FIG. 9b.

FIG. 9e shows a cross section view of the vortex oxygenator of FIG. 9a taken at the cutting plane of FIG. 9b corresponding to a view direction defined by arrows F-F of FIG. 9b.

DETAILED DESCRIPTION OF CERTAIN EMBODIMENTS

Figure 1:
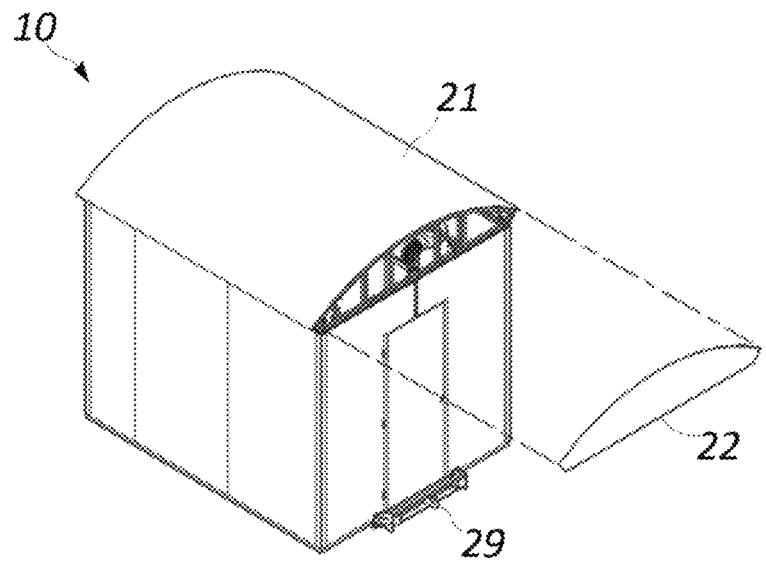
FIG. 1 shows an oblique, front left top view of an aquaponic growing enclosure in accordance with the invention with a gable panel exploded to reveal a gable truss.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this application the use of the singular includes the plural unless specifically stated otherwise, and use of the terms "and" and "or" is equivalent to "and/or," also referred to as "non-exclusive or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise. Also in this specification, the term "means for . . . " as used herein including the claims, is to be interpreted according to 35 USC 112 paragraph 6.

The word "transparent" in this specification means "permeable to electromagnetic radiation of wave-lengths within at least a substantial portion of the visible light spectrum, and may also include permeabilities outside the visible light spectrum to include at least portions of infrared and ultraviolet ranges." The phrase "substantially parallel" when used in this specification to relate a first entity to a second entity shall be taken to mean that the first entity resides within 30° of geometric parallel to the second entity. Similarly, "substantially perpendicular" when used in this specification to relate a first entity to a second entity shall be taken to mean that the first entity resides within 30° of geometric perpendicular to the second entity; "substantially vertical" shall be taken to mean that the referenced entity resides within 30° of a gravitationally-defined or otherwise structurally-defined vertical, and "substantially horizontal" shall be taken to mean that the referenced entity resides within 30° of a gravitationally-defined or otherwise structurally-defined horizontal.

In this specification the terms "hydraulically connected" and "pneumatically connected" mean that by means of piping, plumbing, hose, tubing, open channels or by pressurized or gravity induced flow, a first entity is connected to a second entity such that fluid, as liquid or gas respectively, may communicate with and flow between the first entity and the second entity. Also in this specifica-tion, a vortex oxygenator may also be referred to as a vortex aerator. The phrase "operably connected" and its derivative phrases such as "for operably coupling," when used such as "[A] is operably connected to [B]" means that when [A] is operated then [B] is caused to operate. The operation of [B] in response to [A] may incorporate but not be limited to a direct relation, a proportional relation, or an inverse relation, and time delays may be designed in between the actuation of device or controller [A] and the behavior of [B.] The phrase "[A] is operably connected to [C] by means of [B]" means that [A] is operably connected to [B] and [B] is operably connected to [C,] so that the intermediate component or system [B] may act as a modulating influence on the operation of component or system [C] in response to actuations of device or controller [A.] The operation of [C] in response to [A] may incorporate but not be limited to a direct relation, a proportional relation, or an inverse relation. Time delays may be incorporated between [A] and [B] or between [B] and [C] or both between [A] and [B] and between [B] and [C.]

The words "fish" and "fishes" are often used in the plural to distinguish between a plurality of one species ("fish") and a plurality comprising more than one species of fish ("fishes.") However in this specification the word "fish" may be used as a singular or for a plural-ity of one or more species, and the word "fishes" may be used for a plurality of one or more species of fish.

The invention is an aquaponic system comprising a growing enclosure having a roof and first second trans-parent parallel perimeter walls. A controller may energize a motor-driven spindle above and between the perimeter walls to raise or lower wound sheets of reflective or at least partially opaque material to control sunlight admitted into the enclosure. The reflective material may be light-colored fabric, finely perforated polymer sheet, aluminized mylar sometimes marketed as "space blanket," or membranous layered combinations of light-colored and reflective or at least partially opaque materials.

A fish tank within the enclosure contains fluid and fish and also has a drain outlet leading to a sludge separator. Sludge is processed through a series of biofilter tanks to produce a nutrient fluid irrigated onto plants growing in bed tubes arrayed in cylindrical grow towers. Clear fluid separated from the sludge is oxygenated and returned to the fish tank. Tubs beneath the grow towers contain nutrient soil and other organisms such as earthworms and nematodes.

Several closed loops of pumped fluid flows circulate nutrient fluids among the fish tank, sludge tank, biofilter tanks, and irrigation lines for the grow towers. Flow restrictors balance these flow loops. Vortex oxygenators at points along the flow loops mix air into the circulating nutrient fluids. The towers orient radial arrays of grow bed tubes which support the aquaponic growth of desirable plants such as herbs, edible crops, and other plants that provide benefits when located close to the herbs and crops, such as those which repel crop pests.

Referring now to the figures, FIG. 1 shows an oblique, front left top view of an aquaponic growing enclosure [10] in accordance with the invention with a gable panel [22] exploded to reveal a gable truss. The roof [21] of the system enclosure may be rounded or gabled. The frame of the enclosure further comprises a tow point [29] so that the unit may be easily delivered and positioned and also relocated by a tow vehicle or a winch. As such the system enclosure and its modular aquaponic system are more likely to be classified as non-permanent structures, and thereby evade many land use definitions, regulations, and taxes commonly applied to permanent structures and improvements on the land. The enclosure excludes weed seeds (weeding is commonly a chore in backyard gardening) and also protects the plants from pests.

Figure 2:
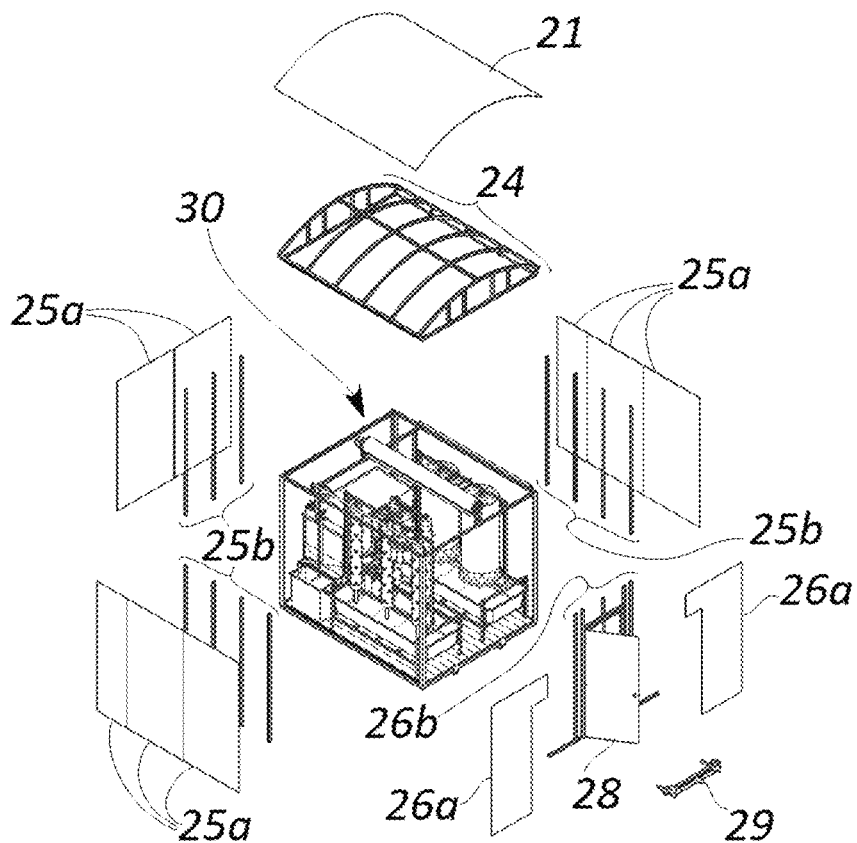
FIG. 2 shows an oblique, front left top view of the aquaponic growing enclosure of FIG. 1 with the frames and wall panels, door frame, and the roof and roof truss members exploded to reveal the interior assemblies.

FIG. 2 shows an oblique, front left top view of the aquaponic growing enclosure of FIG. 1 with the frames and perimeter wall panels, door frame, and the roof and roof truss members exploded to reveal the interior assemblies. The aquaponic system comprises a growing enclosure having a roof [21] supported by a roof truss and frame assembly [24.] At least a first and second perimeter wall of the enclosure include transparent or at least translucent materials to admit light for growing plants. The transparent material may be glass but is preferably a polymer such as an acetate, acrylic, or polycarbonate. Modern polymers may include UV resistant additives and other ingredients that resist becoming opaque or yellowing over time. In preferable embodiments, grow bulb lighting fixtures may also be included in the roof framing and elsewhere as desirable. Additionally, cameras may be optionally included and mounted on the structural framing where convenient, which allows remote monitoring by smartphone or other remote viewers of the growing plants, the aquatic life and environment, and the perimeter security of the enclosure and its immediate surroundings.

Wall panels [25a] are strengthened by vertical stringers [25b] and at least one wall includes a door [28] with its door framing [26b.] Transparent sheeting [26a] is shaped to conform to the portions of wall proximate the door. A tow point [29] is secured to a lower portion or joist of the frame of the enclosure surrounding the aquaponic system [30] components. For a rectangular enclosure, the first perimeter wall preferably resides substantially parallel to the second perimeter wall with the aquaponic system between these two walls, and with the two walls oriented respectively east and west in accordance with the transit of the sun over the course of a day. Also optionally, twin-wall and multiwall panels made of plastics such as polycarbonate are available in opaque, translucent, and clear sheets for wall and roofing materials for the enclosure.

Figure 3:
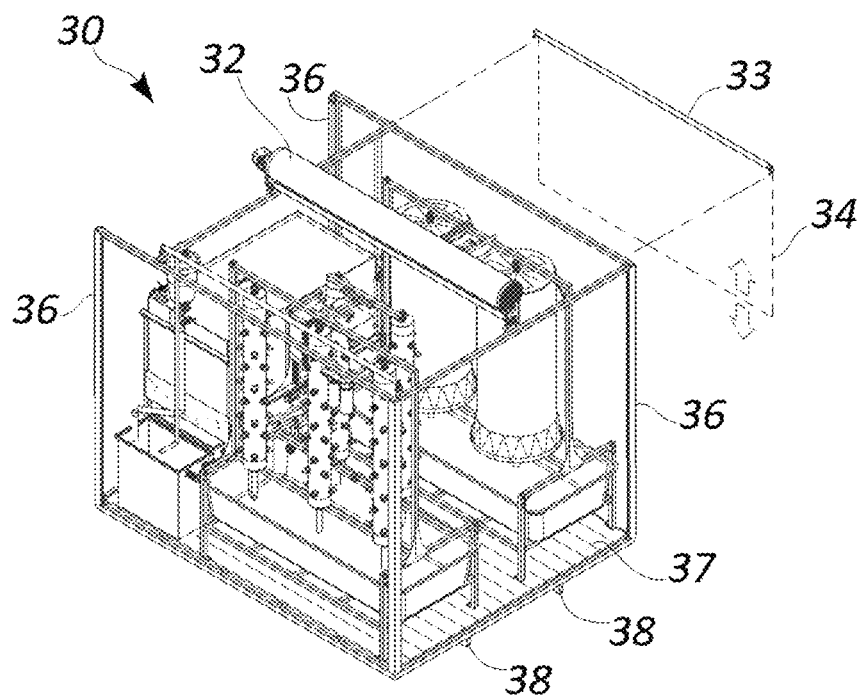
FIG. 3 shows an oblique, front left top view of the flooring of the aquaponic growing enclosure of FIG. 1, with a fish tank modular assembly and first and second grow tower modular assemblies positioned on the flooring, and a fairlead roller for the extendable and retractable shade membrane exploded from the rest of the frame.

FIG. 3 shows the flooring of the aquaponic growing enclosure of FIG. 1, with the aquaponic system [30] having a fish tank modular assembly and first and second grow tower modular assemblies positioned on a floor [37] bolstered by floor joists [38.] A fairlead roller [33] for the extendable and retractable shade membrane [34] is shown exploded from the rest of the frame. The perimeter walls are secured to corner pillars [36.] The shade material is raised and lowered at its perimeter wall by winding and unwinding of a motor-driven spindle [32] deposited between an upper edge of the first perimeter wall and an upper edge of the second perimeter wall substantially parallel and spaced apart from it. The axis of rotation of the spindle is substantially parallel to at least one from among the first and second perimeter walls so that turning the spindle simultaneously pays out or takes up shade membrane material at both the first and second perimeter walls as seen in FIG. 4.

Figure 4:
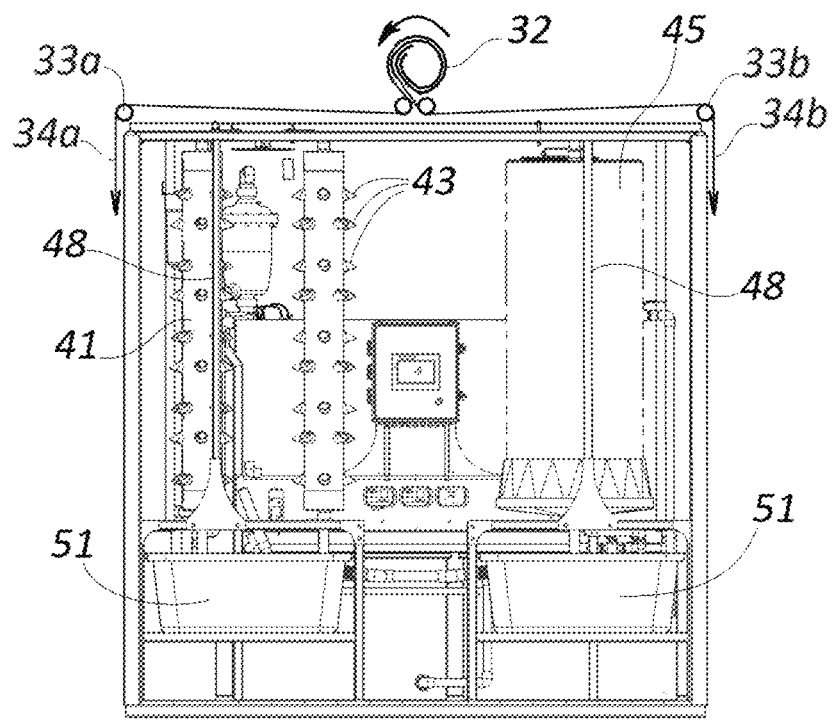
FIG. 4 shows a front view of the modular assemblies and flooring shown in FIG. 3.

FIG. 4 shows a front view of the modular assemblies and flooring shown in FIG. 3. Motor-driven rotation of spindle [32] winds and unwinds sheets of reflective material to raise and lower the sheet ends as deployable and retractable shades controlled by the motor. A first sheet of reflective material [34a] is affixed to the spindle such that in an at least partially unwound condition the first sheet passes over a first fairlead spindle [33a] to reside proximate and substantially parallel to an interior surface of the first perimeter wall, and a second sheet of reflective material [34b] is also affixed to the spindle such that in an at least partially unwound condition the second sheet passes over a second fairlead spindle [33b] to reside proximate to and substantially parallel to an interior surface of the second perimeter wall.

Depicting an end view of the motor-driven spindle [32] it is seen that in an at least partially wound condition a portion of the first sheet of reflective material is wound around the motor-driven spindle and a portion of the second sheet of reflective material is also wound around the motor-driven spindle, so that a radial succession layers of wound materials on the motor-driven spindle comprise alternating layers of the first sheet of reflective material and the second sheet of reflective material. Also seen in this view are fluid risers [48] which deliver nutrient rich fluids to the smaller diameter cylindrical grow towers [41] and the larger diameter cylindrical grow towers [45.] The grow towers include grow bed tubes [43] which contain and support plant being grown according to aquaponic methods, that is without containing soil in the bed tubes. The grow towers are positioned above grow bed tubs [51] which contain nutrient soils and organisms such as nematodes or worms.

Figure 5A:
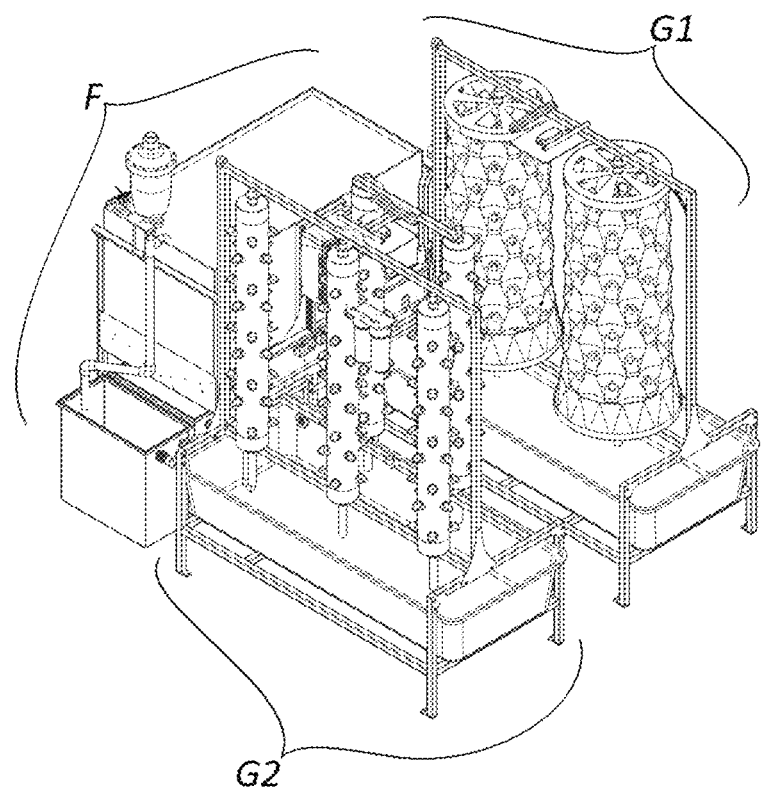
FIG. 5a shows an oblique, front left top view of the modular subassemblies seen in FIG. 3.

FIG. 5a shows an oblique, front left top view of the modular subassemblies seen in FIG. 3. The aquaponic system housed by the enclosure comprises a first fish tank assembly [F] which includes the fish tank, a circulation pump, the sludge tank and a series of biofilter tanks; a first grow subassembly [G1] which includes larger cylindrical grow towers that are built up of stacked rings, and a second grow subassembly [G2] which includes a larger number of smaller-diameter grow tower cylinders.

In contrast to a typical backyard greenhouse, garden, or a typical aquaponic system marketed to a suburban household, the inventive system includes programmable deployable reflective sheeting to allow nearly year-round growing, especially when using aluminized mylar as reflective sheeting. By selectively deploying the sheets to deflect strong sunlight during hotter hours, admit warming sunlight during cooler hours, and retain internal heat at night by reducing radiational cooling, the effective growing season may be extended through most or all of a year in many temperate climate regions, and the temperature of the fish tank may be maintained within a range comfortable to the fish, without needing extraneous power sources for tank water heaters or air conditioning equipment. Even in regions with high daytime temperatures due to strong sunlight, the inventive aquaponic system with automatic control of reflective and insulating sheeting is able to maintain moderate temperatures in the fish tank throughout both day and night and even while temperatures outside the enclosure are beyond the ranges effective for fish keeping.

Figure 5B:
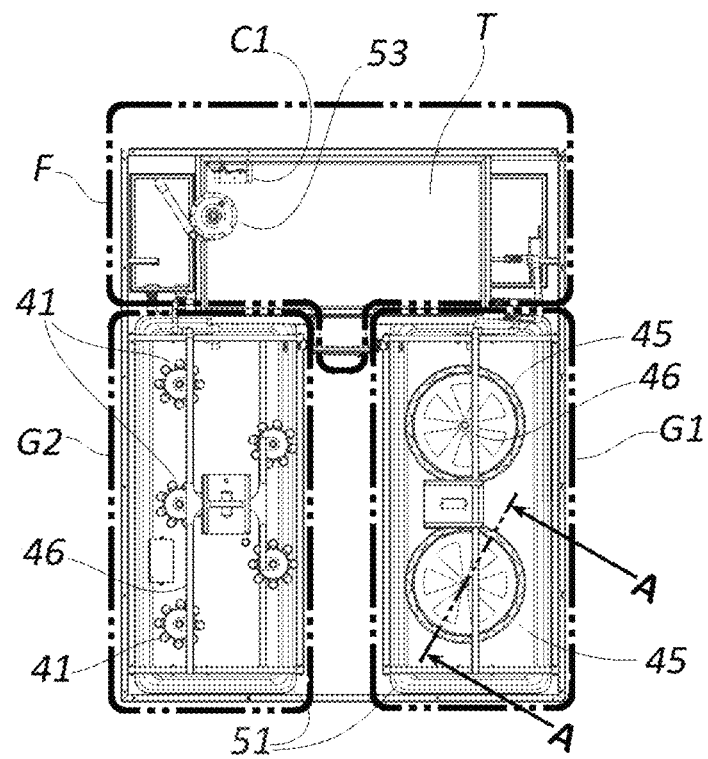
FIG. 5b shows a top view of the modular subassemblies seen in FIG. 5a and defines section line A-A for the cross section view seen in FIG. 5c.
Figure 5C:
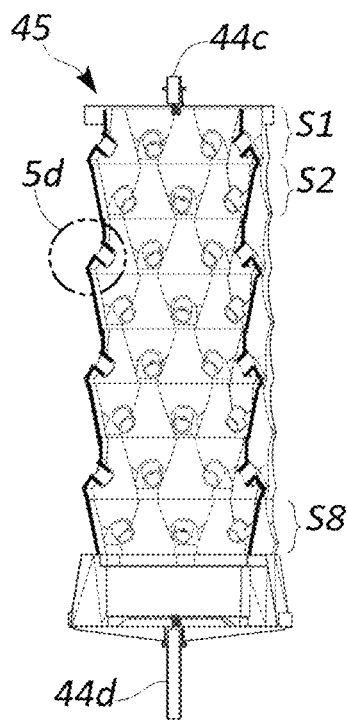
FIG. 5c shows a cross section view of one of the larger diameter aquaponic grow tower assemblies of a second of the subassemblies of the invention, and includes a detail portion for the enlarged view of the cross section seen in FIG. 5d.

FIG. 5b shows a top view of the modular subassemblies seen in FIG. 5a and defines section line A-A for the cross section view seen in FIG. 5c. The fish tank assembly [F] includes a fish tank [T] with an aquarium filter [C1] which may combine any or all of the typical structures used in fresh and salt water fish tanks. Biological filters are the most commonly used type of fish tank filter. They use natural bacteriæ to break down fish waste and other organic matter, making the water cleaner and healthier. Mechanical filters remove larger particles such as fish waste or uneaten food and may also trap some sludge from the aquarium. Chemical filters remove dissolved substances and other chemicals from the aquarium water such as ammonia, nitrates, and phosphates, which may be harmful to fish. The fish tank assembly also includes cyclone filter [53] which uses centrifugal force to separate nutrient fluid and sludge extracted from the tank. The centrifugal force separates solid particles and other heavier materials from fluid and in this invention separates it separates sludge, fish waste, and uneaten food from the nutrient fluid, and thus the cyclone filter eliminates the need for sand filters or filter mats used or required by other aquaponic systems. Some plumbing is omitted in this view for clarity.

Nutrient fluid from the biofilters is pumped to irrigation lines positioned above the tops of the grow towers, so that with at least one grow tower subassembly deposited beneath the at least one irrigation line [46,] each grow subassembly comprises at least one substantially vertical hollow cylinder having a plurality of radial apertures and deposited above a grow bed tub [51.] A single tub may reside beneath one or more than one grow tower. In preferable embodiments the fluid from the irrigation line is drawn from the bio filter tanks and especially the last of a series of such tanks, with the tanks being connected in series and the tubs in parallel. The irrigation lines are suspended over the grow towers.

A first grow subassembly [G1] includes cylin-drical grow towers [45] that are built up of stacked rings, and a second grow subassembly [G2] includes a larger number of smaller-diameter grow tower cylinders [41.] The smaller towers may be spaced apart further than the larger ones to admit more light between the towers.

Figure 5D:
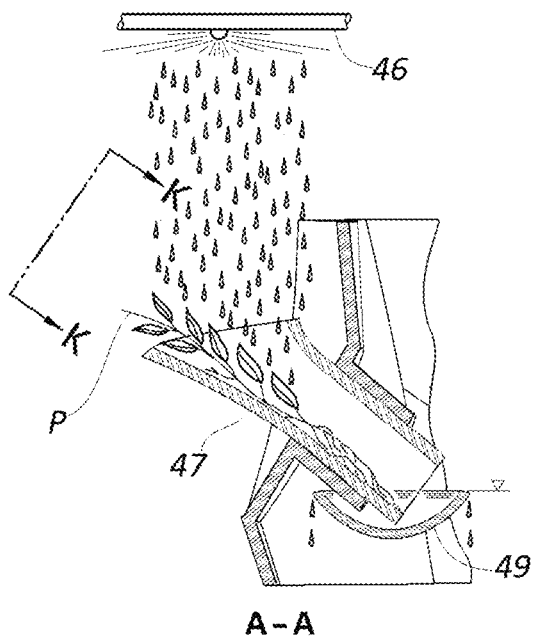
FIG. 5d shows an enlargement of a detail portion of the cross section of the grow tower assembly shown in FIG. 5c, and defines view direction K-K for the auxiliary view FIG. 5e.

FIG. 5c shows a cross section view of one of the larger diameter aquaponic grow tower assemblies of a second of the subassemblies of the invention, and includes a detail portion [5d] for the enlarged view of the cross section seen in FIG. 5d. The cross section view is taken at section line A-A as defined in FIG. 5a. The grow tower [45] as a unitary assembly is rotatably mounted upon a lower support strut [44d] and this and an upper support strut [44c] cooperate to define an axis of rotation for the assembly. The embodiment shown in this figure comprises a stacked series of eight rings [S1,][S2,] through [S8,] in which in this illustration the plurality of radial apertures of the hollow cylinder reside within the axially stacked series of rings, each having a radial array of apertures. Pluralities of more or fewer rings reside within the scope of the invention.

Each ring defines an interior volume and has a plurality of radially arranged apertures communicating from the interior volume to the outside. Each ring also has mating interfaces for stacking, and in preferable embodiments the radial arrays of apertures stack up in an alternating or staggered radial pattern.

The apertures retain grow beds or grow bed tubes for the plants to be grown. By rotating a grow tower on its spindles, dozens of plants may be inspected rapidly and conveniently. Rotation of the grow tower may also be motor-driven to assist people physically unable to move a tower with their own limbs, and may also allow plants to be rotated over periods of time, either to even out sun exposure to all the plants in a tower or to orient a sunward-facing subset of plants and a corresponding sun-averse set of plants so that a single grow tower may afford optimum environments for diverse sets of plants that include sun-tolerant, moderate sun-tolerant, and shade-preferent species. Sidereal rotation or other scheduled rotations of the grow towers may be controlled by a central computer or controller.

Figure 5E:
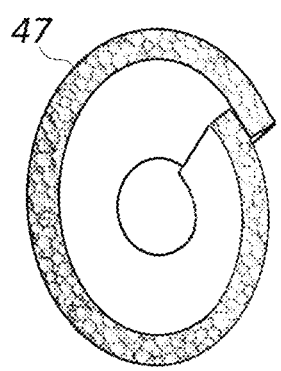
FIG. 5e shows an auxiliary, axial view of a plant support sleeve typically installed in the apertures of stacked ring components of a grow tower for an aquaponic system in accordance with the invention, as seen from auxiliary view direction K-K as defined in FIG. 5d.

FIG. 5d shows an enlargement of the detail portion [5d of FIG. 5c] of the cross section of the grow tower assembly shown in FIG. 5c, and defines view direction K-K for the auxiliary view FIG. 5e. The grow towers include pluralities of radial apertures for receiving bed tubes [47] installed so that they pass through any one from among the plurality of radial apertures, with the bed tube comprising two opposed outlets; with a first of the two outlets residing outside the hollow cylinder and a second of the two outlets residing within the hollow cylinder. A bed tube is preferably inclined with its first, outward-facing outlet higher than its second, inward facing outlet, so that a plant [P] in the bed tube generally grows with leaves propagating outward to collect light and with its roots extending downward. In an alternate embodiment within the scope of the invention, a basin [49] may be located proximate the lower end of the bed tube to collect irrigated fluid collected by the bed tube. Materials for the bed tube may be selected to draw up water to the plant and its roots by capillary action.

The plants in their grow beds receive nutrient fluid delivered by one or more irrigation lines [46] above the grow beds and grow towers. In some embodiments of the invention, the grow bed tubes are formed with upward-facing flared ends which offer larger collection area for falling droplets of fluid and for supporting larger plants or plants of the sort that fan out their leafy growths. An irrigation line may include sets of perforations, or nozzles or both so as to deliver fluid as rain-like falling droplets or as mists.

FIG. 5e shows an auxiliary, axial view of a plant support sleeve as a grow bed [47] typically installed in the apertures of stacked ring components of a grow tower for an aquaponic system in accordance with the invention, as seen from auxiliary view direction K-K as defined in FIG. 5d. Preferable embodiments for bed tubes include absorbent, cancellous, cellular, spongy, alveolar, or hollow fibrous materials so that fluid in the basin [49 of FIG. 5d] may migrate upward within the material of the bed tube by capillary action and deliver fluid, nutrients, and moisture to the roots and to other parts of the plant. The cross section of the bed tube may be varied to produce upward-facing flared conical surfaces to support the plant.

Figure 6A:
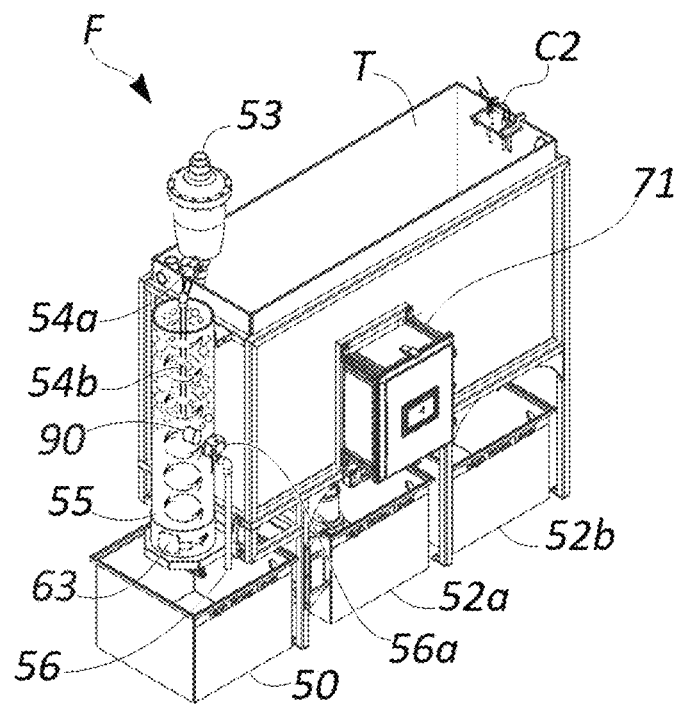
FIG. 6a shows an oblique, front left top view of a fish tank modular subassembly in accordance with the invention, including its ancillary components.

FIG. 6a shows an oblique, front left top view of a fish tank modular subassembly [F] in accordance with the invention, including its ancillary components. The tank includes a heater [C2] with a thermostat system for maintaining fluid at environmental temperatures for the fish, and the tank includes a suction pump within it. The suction pump draws in tank fluid and sludge collected from the bilge portion of the tank and delivers this mixture to a cyclone filter [53] which separates clarified fluid from heavier sludge and solid matter. Clarified fluid is returned to the tank.

The fish tank subassembly includes several bio-filters, of which one [55] comprises a vertically oriented cylindrical chamber. An electrically controlled valve [54a] releases sludge to a central tube [54b] with an outlet proximal to a vortex oxygenator [90] supped with pressurized or compressed air by an air line. A vortex oxygenator may also be referred to as a vortex aerator. In some preferable embodiments of vortex oxygenators, the rotational swirling of the fluid creates a centripetal force which in turn creates lower than ambient pressure in the axial portion of the mixing cavity. This condition allows air to be drawn in from the air line without needing a pump, air compressor, or other air pressurizing machine.

The biofilter is a component of an aquaponics system that allows beneficial bacteriæ to thrive. One function of a biofilter is to convert ammonia from animal or fish urine into nutrients. An aquaponic system creates an environment of co-dependency between fish life and plant life. To flourish symbiotically, each relies on the other for nutrients, food, filtration, the conversion of waste materials into nitrates, and the ability to recirculate cleaned water back into the system. The nitrate cycle eliminates a need for externally added fertilizers for plant growth. Thus in this specifica-tion, the word "water" may also be used to designate also nutrient-filled fluid circulating and being recycled within the aquaponic system.

In an example some embodiments within the scope of the invention, sludge collected from the cyclone filter [53] passes through a vertical cylinder biofilter [55] with at least one vortex oxygenator [90,] then to a sludge tank [50] where larger volumes of solid waste may be retained, and then from the sludge tank to a series of at least two biofilters [52a] and [52b.] In preferable embodiments the biofilter is called a "moving biotower" and includes a pump [63] which expels fluid proximate to tangential to the inter cylindrical surface of the biofilter. More prefer-ably, a centrifugal pump may be used to radially expel fluid proximate to the inner cylindrical surface of the biofilter. The pump impeller helps further break up solid matter into finer and more digestible particles.

In preferable embodiments the mechanical components of the "moving biotower" operate according to a schedule on command of the controller. The schedule may be fixed by the user or may be self-modifying based on programming and sensor inputs to the controller [71.] According to a preferred schedule, the sludge outlet valve [54a] of the cyclone filter opens approximately every 3 to 4 days to introduce sludge separated from circulation of the fish tank into the moving biofilter. The centrifugal pump regularly stirs the slurry which in cooperation with the vortex oxygenator substantially accelerates digestion so that fluid discharged at [56] is a nitrate-rich fluid. The fluid level in the "moving biotower" drops to a little higher than the height of vortex oxygenator [56a] whereupon the discharge is halted. The tank will refill from the periodic discharges of the cyclone filter over the next digestion interval of several days.

In contrast to the invention, most other aquaponic systems and especially those sold to novice operators typically send all the sludge and solid matter directly to the grow beds. This material must be cleaned out from time to time as it decays. Typically in these less-preferred systems, grow beds must be cleaned monthly, filters must be cleaned daily, and the material removed is lost to the system instead of being recovered as usable nutrients. When a typical, less-preferred system (not in accordance with the invention) is not maintained regularly, nitrites build up which are toxic to fish. The source of the nitrites is primarily from anaerobic bacteriæ and clogged filters or filters overloaded with undigested fish food or fish waste. These clogged and stagnant areas tend to produce oxygen depleted zones where anaerobic bacteriæ thrive and destabilize the natural balance of the nutrient cycle. The typical, non-inventive systems require that if not the user, some person should be available to visit and perform these recurring daily and monthly maintenance chores.

Examining the inventive cycle by starting with waste from fish farming, as fish excrement begins to decay it breaks down to produce ammonia. If left unchecked, this ammonia content will rise to levels toxic to the fish and eventually they would die. Decaying organic matter from leftover food and dead plant components contribute to sources of ammonia content in the fluid. In aquaponics, beneficial nitrifying bacteriæ are also present in the system to convert ammonia into nitrite compounds. At this phase, the danger to the fish has been mitigated but the nitrites are not directly usable for the nourishment purposes of the plants. Beneficial bacteriæ such as *Nitrobacter* and *Nitrosomonas* present in the oxidation process convert nitrites into nitrates, so the nutrients may be absorbed as plant food. Without these beneficial bacteriæ, the aquaponic system would fail.

The aquaponics closed-loop cycle and system works when sufficient beneficial bacteriæ are present to complete the conversion cycle. A common cause for a shortfall of desired bacteriæ is a lack of surface area for the bacteriæ to grow. The system as disclosed herein provides means for expansions of necessary microbe populations at any stages of the conversion process by providing a plurality of biofilters. Biofilters include structures such as perforated plates or tubes and materials such as sands, gravels, and crushings of porous or cancellous rock to provide large submerged surface areas hydraulically connected within the aquaponic system so additional bacteriæ may establish colonies and grow, increasing the efficiency of the nitrification process if it is underperforming. Most of these bacteriæ are sessile, which means they adhere to objects and remain in the biofilters as they process wastes within the fluid, rather than circulating with it. Sand or gravel may be used as a growing medium as nitrifying bacteriæ proliferate on the surface area of the granules. Diatomaceous earths are harmful to some of the organisms which are beneficial to aquaponic cycles and are thus generally not used in these systems.

Because these bacteriæ require oxygen to grow and thrive, biofilters are preferably provided with oxygenators to allow increased growth rates in response to increases in ammonia-containing waste products in the fluid. Plants then take up the nitrates, further cleaning the water which is then returned to the fish tank to continue the cycle.

With two populations of living organisms co-existing together, a balance is preferably maintained, else one population would thrive and the other would decline. Among several factors to be considered, a pH of 7.0 to 7.5 for the circulating fluid is considered neutral and ideal for both sets of organisms. If the pH were to drop below 6.0, the nitrification process would slow greatly and become unable to detoxify the ammonia levels in the fluid, and the fish and the plants would not receive enough nutrients. Excess bacteriæ die off once elevated concentrations of toxins have been consumed and mitigated. The Malthusian surges and declines in bacteriæ correct this imbalance automatically over time, and under judicious management the system may be maintained at sustainable, steady state levels depending on the rates of growth and harvesting of plants and the population of fish in the tank. In an ideally balanced cycle nothing goes to waste; at a microscopic level the material is exchanged from the structure of one organism to another.

Regular monitoring may be used to detect pH deviations and take corrective actions to control them. Recursion to optimum ranges may occur naturally in a system that includes growing media of gravel, clay, or lava stones which provide large enough surface areas to encourage bacteriæ growth. Artificial bio-filter products also usable within the invention are produced as textured disks, pellets, or perforated tubes and sheets. Some of these products may be selected from materials close to the density of water or may be produced with gas-filled closed cells so that they are close to neutral buoyancy in water and less likely to become compacted, which would reduce available surface area for growth. In the inventive system as disclosed and described herein, the grow bed tubs beneath the grow towers also act as biofilters. Problems may occur when this natural filtration system is overwhelmed by fish waste, such as if more fish are added at a once, or many fish are birthed in the tank, or if too much fish food were added to the habitat and not eaten. The excess food sinks to the bottom and decays. Any of these events will raise production of ammonia.

In preferable embodiments a physical or mechanical filter may be installed upstream of a biofilter to trap foreign, indigestible matter or to retain large volumes of fish waste. Since these areas may not be provided with or be close enough to an oxygenator, if too much solid waste is allowed to accumulate it may create an anaerobic zone that will encourage excessive bacteriæ growth in areas other than the biofilters. Anaerobic bacteriæ do not produce nitrates beneficial for plant uptake, and so the system efficiency would deviate from optimal cycle conditions. With the system pH be maintained at or below 9.5, earthworms may thrive in gravel beds in the grow tubs, consuming oxygen and fish sludge and producing very rich nutrition for plants by internally converting nitrites to nitrates. Plants grown using the inventive aquaponic system in its enclosure have been observed by the inventor to grow about 30% faster than typical backyard gardening because of these exceptionally rich nutrients not produced by other systems.

The volume of solid waste generated by the fish in the tank varies with the population and the age of the fish. Older fishes are physically larger and they eat more and excrete more waste in both size and volume. In preferable operation modes, fish are harvested out of the system (for eating or for being processed into animal feeds) and the tank is restocked with young or newly spawned fish to produce a staggered age range of the fish in the tank. An exemplary stocking schedule employs harvesting every three months, selecting the more mature fish weighing about 500 g or more, and restocking them with new fingerlings or juvenile fish weighing about 50 g each. This staggering method avoids swapping out of all the fish at the same time and alleviates sudden impacts on the system. If a full fish exchange were to take place at the same time i.e, "out with the old and in with the young," then that would require drastic adjustments in other areas in the filtration process.

With more than one biofilter connected in more than one pumped flow loop, undesirable large fluctuations of ammonia are automatically compensated for, as the water and the waste circulate as a nutrient-carrying fluid, maintaining the delicate balance of this bio-diverse system. Without biofilters, time-consuming re-calibration tasks would need to be incorporated into a more frequent maintenance routine. pH monitoring may also be performed by the system controller.

In contrast to the typical available aquaponics systems, the inventive system recycles 100% of all nutrients and is computer controlled so that anyone can grow using an aquaponic system without having to master the complexities of the nutrient cycles involved, and also without having to discard waste products frequently. Also, in contrast to the near daily chores of a typical aquaponic system or a backyard garden, a city or suburban dweller may acquire a remote parcel of land at a low property tax rate and operate the system remotely with relatively infrequent visits. An aquaponics system constructed in accordance with the invention to a size of 10 ft wide by 10 ft long by 10 ft high may feed 4 to 6 people at least nearly continuously throughout the year. Unlike the regular daily and monthly maintenance chores of a typical aquaponics system, because the inventive system described herein needs far less frequent on-site interventions, maintenance, and adjustments, the system is also amenable to be installed and operated remotely at a "bug-out" property where a suburban or city dweller may use the system to secure a stable and at least mostly continuous supply of fresh, diverse, and nutritious foods in the event of a disruption of logistics for delivering typical supermarket and grocery foods to a metropolitan area.

Figure 6B:
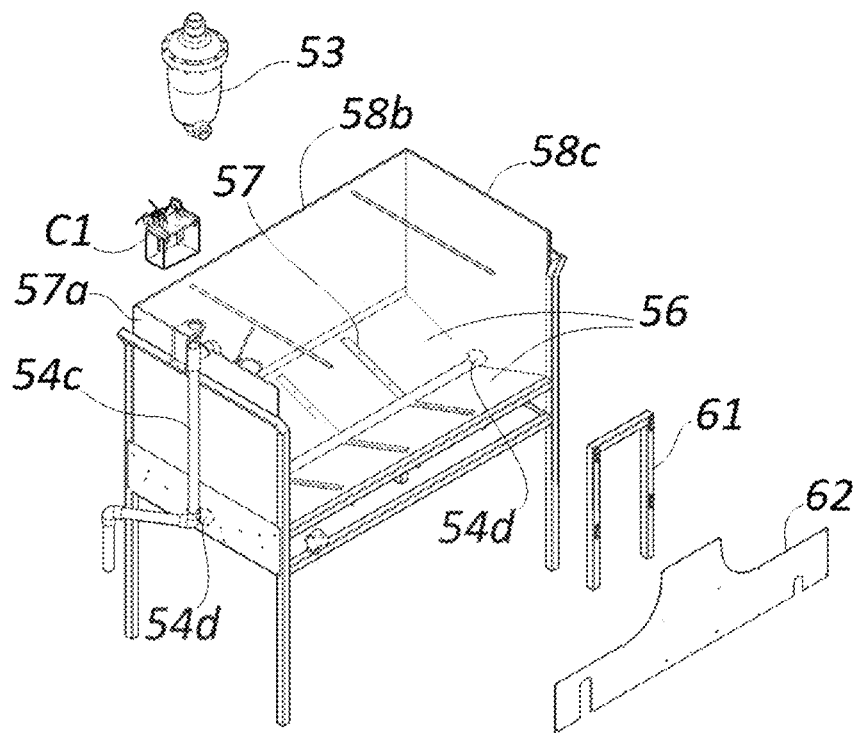

FIG. 6b shows an exploded, oblique front left top view of components of the fish tank of FIG. 6a. The fish tank for containing fluid and at least one fish has a floor with dihedral surfaces [56] which converge to form a drainage groove. The dihedral plates may be reinforced at intervals with ribs [57] or riffles. A fish tank drain outlet proximal to an end of the drainage groove is implemented in this embodiment as a siphon [54c] having an inlet proximal to an end of the drainage groove and which may be assisted at its inlet at the drainage groove or at another location along the siphon path by a pump. In alternative embodiments the fish tank drain may comprise or pass through a perforation through an end wall [57a] or [58c] of the tank such as at locations [54d] shown as dashed line circles. In this figure one side wall [58b] of the tank is shown and its opposite is omitted to reveal the floor components of the tank. The siphon leads to the sludge tank as shown in other figures. In this embodiment, in front of the omitted front tank sidewall a support frame [61] is provided for the controller and its accessory modules. The frame affixes to a plate [62] or shroud which may be ornamental or may protect the tank sidewalls (such as if these are made of glass) from impacts when a person inside the enclosure is working on other aquaponic components, especially with metal tools. The cyclone filter housing [53] and a conventional aquarium filter [C1] are also shown proximal to but exploded from the fish tank wall components.

Figure 6C:
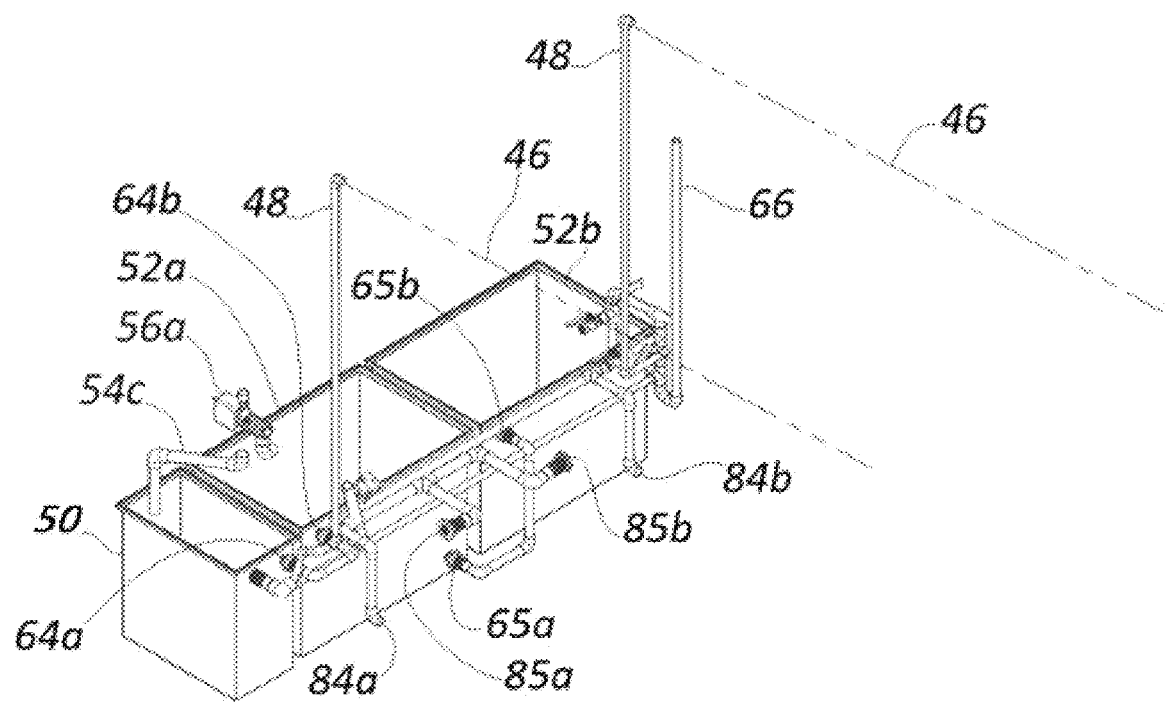
FIG. 6c shows an oblique front left top view of a set of lower components of a modular fish tank assembly in accordance with the invention, which reside beneath the fish tank itself.

FIG. 6c shows an oblique front left top view of a set of lower components of a modular fish tank assembly in accordance with the invention, which reside beneath the fish tank itself. A drain line [54c] leads from the fish tank drain to sludge tank [50.] The vortex oxygenator [56a] for the cylindrical biofilter seen in FIG. 6a is shown in this figure. In series, outflow from the sludge tank enters the first [52a] of a plurality of biofilters which are connected in series. The second and last of the series of biofilters is [52b] in the embodiment shown.

In this embodiment fluid flow leaves the sludge tank at [64a,] enters the first bio filter at [64b,] then leaves the first biofilter at [65a] to enter the second biofilter at [65b,] whereafter it may then be pumped to various other locations. In preferable embodiments the elevations of in-flow and outflow fittings in the series of tank components are alternated so that incoming fluid arrives into a tank at an elevated location and leaves at a low-level location to allow nutrients to percolate through the biofilter media. Conversely, in the grow bed tubs (not shown) fluid may be introduced at a low point such as [84a] and [84b] to fill the tubs slowly and gently and not unduly disturb the soils, growing media, and living organisms therein. Overflows from the grow bed tubs at [85a] and [85b] return to the biofilters at an elevated point. Pumped nutrient fluid is delivered to the grow towers by risers [48] which connect to overhead irrigation lines [46.] The irrigation lines may include sets of perforations, or nozzles, or both so as to deliver fluid as falling droplets or as mists. Fluid from the last of the series of biofilters may be drawn by pump and delivered back to the fish tank by riser [66.]

Figure 7:
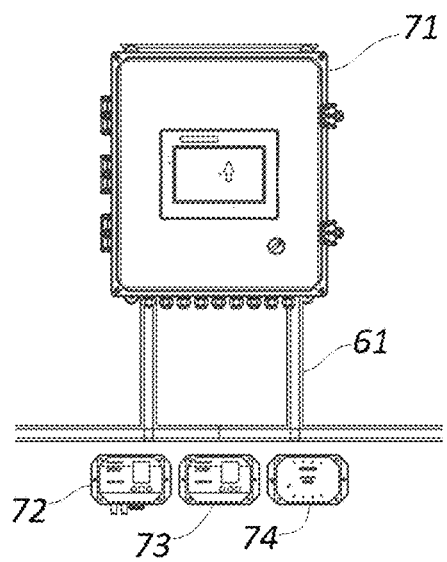
FIG. 7 shows a front view of the enclosure for a controller module and three of its ancillary sub-modules as preferably mounted proximal to the main control module enclosure.

FIG. 7 shows a front view of the enclosure for the controller module [71] mounted on frame [61] and three of its ancillary sub-modules as preferably mounted proximal to the main control module enclosure. Typical instrumenta-tion available for use with the inventive aquaponics system include sensor banks [72] and [73] which connect to probes located in fluids, grow beds, and anywhere needed to monitor environmental parameters. Transducers are available for measuring parameters including but not limited to pH, water conductivity, temperature, flow rates, and oxidation reduction potential (ORP.) Oxidation reduction potential describes the ability of any body of water to break down waste and contaminants including dead plant and animal matter. Another way of describing ORP is a tendency of water to gain or lose electrons. This ability comes from the amount of oxygen present in the water. The more oxygen the water may carry, the more efficient the bacteriæ may be at decomposing and metabolizing waste materials.

Other accessory controllers [74] may be used to log events, emit alarms, compile data files, detect and report deviant or extreme conditions, and command dosing of additives into the fluid for countering deviant conditions. For example, calcium carbonate and potassium carbonate are used to raise pH, while phosphoric acid and citric acid may be used to lower pH.

A user of the hydroponic invention may enter an ORP set point value and when the value drops below this set point the device will trigger an alarm, activate a corrective response, or both. A preferred ORP value for maintaining optimal hydroponic crop health may range within about 300 mV to about 400 mV. Ozone ($O_3$) may be added to the solution via venturi injectors, corona discharge, or ORP raising additives such as hypochlorous acid may be injected into the solution when signaled by the controller. Venturi injectors create a pressure differential between their fluid inlet and outlet ports, which in turn creates a vacuum inside the injector body. The vacuum allows ozone gas to be drawn from a supply tank into the flowing fluid stream via the suction port on the injector.

The data gathered by the sensors of the inventive system may also be transmitted by internet to a smartphone user or to off-site aquaponic management software. The remotely gathered data may be stored for analysis. The enclosure may also be equipped with one or more remotely or electronically-controlled ventilation fans for interior air temperature and humidity management. Maintaining a relative humidity of 30% or lower within the enclosure reduces or prevents undesirable mold growth.

Light intensity sensors such as photovoltaic or cadmium sulfide-type photoresistors may be included in the set of system sensors electrically connected to one or more controllers. Combined with thermal sensors, thermistors, thermocouples and other means for temperature sensing and measurement, the motor and motor-driven spindle of FIGS. 3 and 4 may be operably connected to the controller and a temperature sensor so that when a predetermined temperature is sensed, the controller energizes the motor to rotate the motor-driven spindle to raise or lower the reflective material sheets and thereby adjust the amount of light admitted into the enclosure. Shot noise from a diode or other semiconductor junction varies directly with absolute temperature and may be used as a thermal sensor in the system as disclosed.

In other preferable embodiments the controller may be operably connected to a photosensor so that when a predetermined light intensity is sensed, the controller energizes the motor to rotate the motor-driven spindle. In yet other preferable embodiments the controller may be operably connected to a clock so that at a predetermined time the controller energizes the motor to rotate the motor-driven spindle. By selectively deploying and retracting the reflective materials wound around the spindle, solar heat may be collected at cool times of day, blocked to prevent excessive heat while the solar intensity is strongest, and then retained late in the day, so that growing seasons may be effectively extended in growing regions constrained by temperature excursions outside the optimum ranges for growing. The system may be deployed in biomes and global regions currently considered marginal or inarable, including boreal forest and taiga and also desert heat regions where if water is available excessive solar heating may be mitigated by the automatic control of the reflective material sheets and also by evaporative cooling. Thus the invention may enable peoples in marginal regions to resist climate change.

Figure 8A:
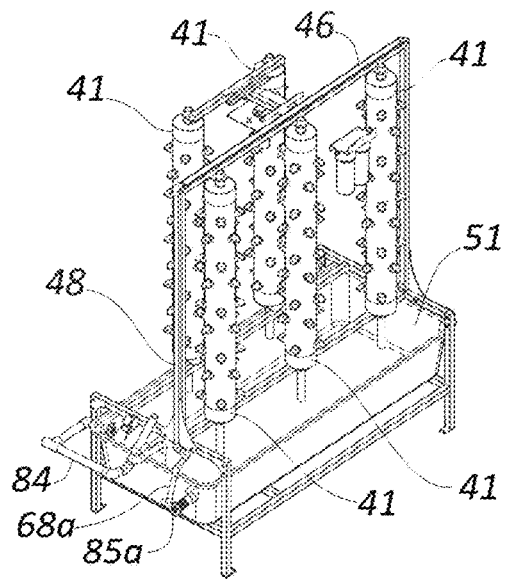
FIG. 8a shows an oblique, rear left top view of a first grow tower modular assembly in accordance with the invention.

FIG. 8a shows an oblique, rear left top view of a first grow tower modular assembly in accordance with the invention. Some tubing and fittings are omitted for clarity in this figure. The assembly includes a grow bed comprising a tub [51] having a drain and an overflow outlet [85a.] Nutrient fluid is introduced into the grow bed tub at [84.] In some embodiments the inflow plumbing directs fluid primarily to the bottom of the bed, but alternatively some or all of the incoming fluid may be introduced at an elevated point of the tub, or fluid may be introduced at more than one level.

The first grow tower modular assembly includes a plurality of cylindrical grow towers [41] which are substantially vertical hollow cylinders having a plurality of radial apertures and deposited above the grow bed. Each grow tower supports a plurality of bed tubes which communicate from the exterior to the interior of the tower cylinder. Plants are deposited in the bed tubes for growing, and irrigation of nutrient fluid is directed to the plants by being pumped from the biofilters to at least one riser [48] hydraulically connected to an overhead irrigation line [46.]

Figure 8B:
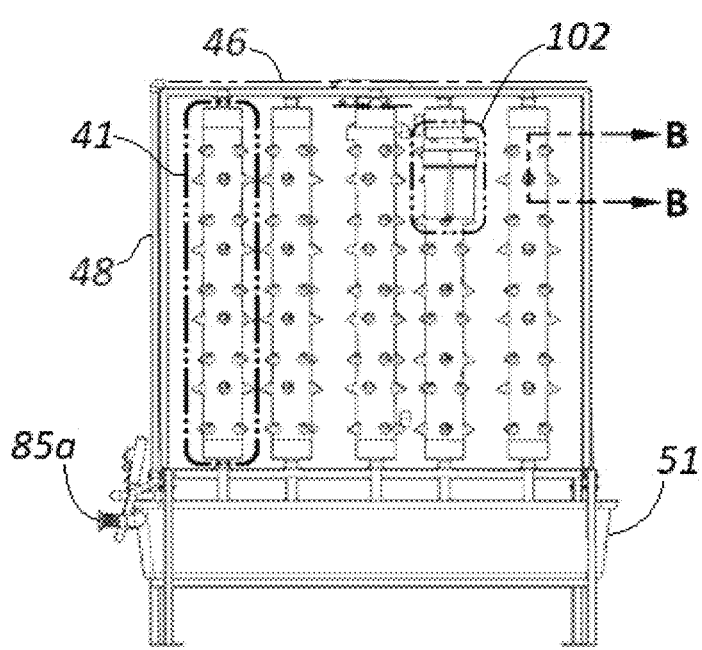
FIG. 8b shows a left side view of the grow tower modular assembly of FIG. 8a, and defines section line B-B for the cross section view seen in FIG. 8d.
Figure 8C:
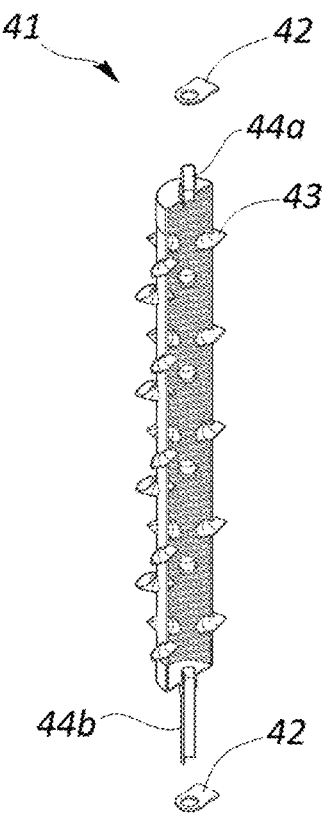
Figure 8D:
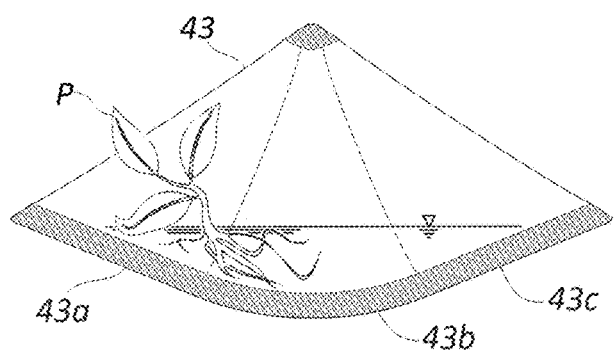
FIG. 8d shows a cross section view of a typical bed tube taken at section line B-B in FIG. 8b.

FIG. 8b shows a left side view of the grow tower modular assembly of FIG. 8a, and defines section line B-B for the cross section view seen in FIG. 8d. The grow bed comprises a tub [51] having a drain and an overflow outlet [85a.] Some tubing and fittings are omitted for clarity in this figure. The grow tower modular assembly includes a plurality of cylindrical grow towers [41] which are substantially vertical hollow cylinders having a plurality of radial apertures and deposited above the grow bed. Nutrient fluid is directed to the plants deposited in bed tubes of grow towers by being pumped from the bio-filters to at least one riser [48]hydraulically connected to an overhead irrigation line [46.]

The aquaponic system may also be connected to domestic or municipal water supply to provide make-up water as required. Municipal water is usually treated with bactericides and as with aquarium practice, preferably these are neutralized before the water may be introduced into the nutrient fluid system. Filters [102] that may include carbon or a reverse osmosis system are preferably included at system entry points for "city water."

FIG. 8c shows an oblique view of a midplane cut-away of a smaller diameter grow tower [41] of the grow tower modular assembly of FIG. 8a. An upper spindle [44a] and a lower spindle [44b] extend axially above and below the hollow cylinder portion of the grow tower. The grow tower comprises radial pluralities of apertures with at least one bed tube [43] passing through any one from among the plurality of radial apertures, and in preferable embodiments every such aperture is fitted with a bed tube. Plants are deposited in the bed tubes and nutrient fluids are delivered by overhead irrigation lines as shown in previous figures. The spindles are retained in brackets [42] which allow the tower to be rotated so that all plants in a grow tower may be inspected, maintained, or harvested from any one access direction to the tower. Rotation of the grow towers may be motorized to facilitate access for handicapped persons or may be motorized for sidereal rotation or other schemes to expose the plants in the tower to available sunlight at various times and schedules.

FIG. 8d shows a cross section view of a typical bed tube [43] taken at section line B-B in FIG. 8b. A bed tube in accordance with the invention comprises two opposed outlets and an arcuate portion [43b] between the opposed outlets, with a first of the two outlets [43a] residing outside the hollow cylinder, a second of the two outlets [43c] residing within the hollow cylinder, and with the arcuate portion oriented to form a fluid collection basin. A plant [P] grown according to an aquaponic method grows in the bed tube and its roots take up nutrients from the fluid in the basin without any soils or other growing media.

Figure 8E:
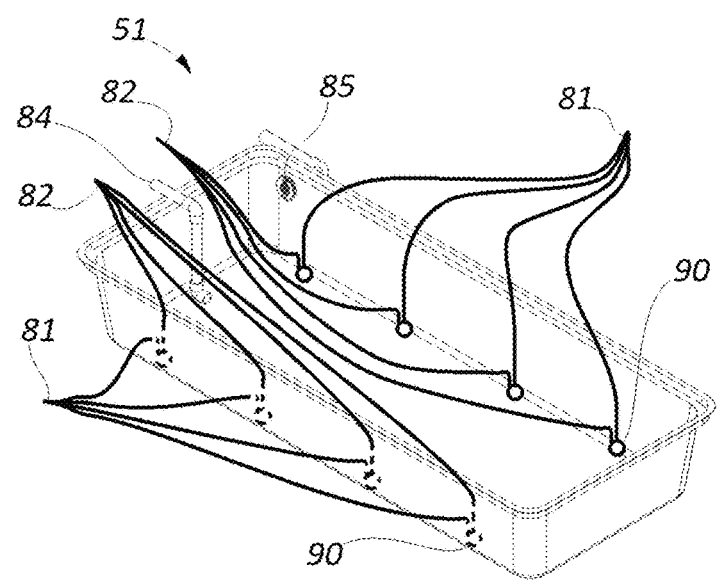
FIG. 8e shows an oblique, front left top view of a tub for a grow bed placed beneath the grow towers of FIG. 5c or 8a, including a plurality of vortex oxygenators connected to fluid and air supply lines.

FIG. 8e shows an oblique, front left top view of a tub [51] for a grow bed placed beneath the grow towers of FIG. 5c or 8a, including a plurality of vortex oxygen-ators [90] connected to fluid supply lines [82] and air supply lines [81.] The grow bed tubs include a plurality of at least one vortex oxygenator each pneumatically connected to a pressurized air source and hydraulically connected to a nutrient fluid source, wherein at least a first vortex oxygenator from among the plurality is deposited within the tub. The overflow outlet [85] of the tub is hydraulically connected the sludge tank, and from there to the first from among the series of at least one biofilters as shown and described in FIGS. 6a and 6c. Fluid may also be delivered to the media in the grow bed tub by the tub drain (with replacement fluid entering the tub through its drain acting as a tub inlet) or by other plumbing [84] directing water into the tub at a low elevation.

Many contemporary and prominent information sources in the aquaponics industry teach that fluid levels in the grow beds should if not must fluctuate periodically so as to regularly expose the roots of the plants in the grow beds to oxygen. (1) Writing on 22 Mar. 2022, John Garner of "Ponics Life" teaches that "The continuous rise and fall of the water level is important for the health of your aquaponic garden." (2) Writing on 14 May 2023, the company blog of "Go Green Aquaponics" published that "A bell siphon is an essential component of a media based aquaponics system. It is responsible for regulating the entire system s water flow and efficiently helping move the water from the media bed into the fish tank." (3) Jeremiah Zac, writing for "World Water Reserve" on 25 Jul. 2023 published firstly that "Our team of experts independently researches and tests products to bring you our best recommendation," and "Those who are familiar with the mechanics of an aquaponics system understand the importance of the continuous rising and falling of the water levels. This ebb and flow allows vital nutrients to be distributed throughout the entirety of the system, ensuring a healthy, functioning environment." (4) On 6 Aug. 2023, Johnathon Greenfield wrote at www.aquaponicsexpert.com that "A bell siphon is key component in aquaponics systems that helps to regulate the water flow and maintain optimal conditions for plant growth," and that "The bell siphon plys a crucial role in maintaining proper oxygen levels and preventing root rot in the plant roots." Thus, published contemporarily with the invention, raising and lowering the fluid levels in aquaponic system grow beds to periodically expose plant roots to air for oxygenation is recently and currently taught variously as "essential," "crucial," "important," and "a key component." The inventor however, dispenses with bell siphons or other means of raising and lowering the fluid level in the grow beds, in novel variance from the teachings of experts in the field.

Most systems other than the invention use a bell siphon in the grow beds to oxygenate the roots by periodically draining the fluid to expose the roots to air, but a bell siphon requires an additional holding tank. Many articles have been published explaining to novice users how to construct a bell siphon, and how to prevent it from becoming clogged with solid matter from the grow bed. Other aquaponics systems use a flood and drain timer, which also require a pump, a source of power to the pump, and an additional holding tank. Other systems eliminate the additional holding tank by temporarily transferring fluid from the grow bed into the fish tank, however the change in fluid volume in the fish tank would require a larger tank whose capacity is only fully utilized while temporarily holding the additional fluid from the grow beds, and also large changes in fluid volume of the fish tank is known to disturb the fish.

In contrast, the invention contravenes published experts by dispensing with extraneous machinery and the need for its maintenance by providing vortex oxygenators in the grow beds so that the fluid surrounding the plant roots therein is sufficiently oxygenated to provide for proper nutrient uptake from the nutrient fluid and to prevent the problems associated with stagnant, oxygen-poor water in the grow beds: unwanted mold growth, unpleasant odors, or yet additional periodic maintenance chores of manually draining fluid from the grow beds, holding it in an additional container, and then re-filling the beds, along with checking for and removing unwanted sludges or wastes. Note that in the inventive system, sludges are 100% recycled and reinvigorated into nutrient-rich products for the plants to take in.

The vortex oxygenators in the grow beds and at other locations in the fluid cycle loops of the inventive system advantageously produce microbubbles, which eliminate the need to expose the plant roots to air. Similarly, earthworms do not usually survive well in water, but the oxygenation provided by the microbubbles allows earthworms to thrive in the grow beds in the nutrient fluid produced by the invention. Also, by eliminating the extra holding tank required by the bell siphon or other systems that drain and refill the grow beds, the invention offers a more compact design and less complex operation because many repetitive chores are eliminated. Cleaning chores are eliminated by recycling into the system the materials that other systems discard as wastes and thereby fail to recover and put to use all available nutrient sources.

Figure 9A:
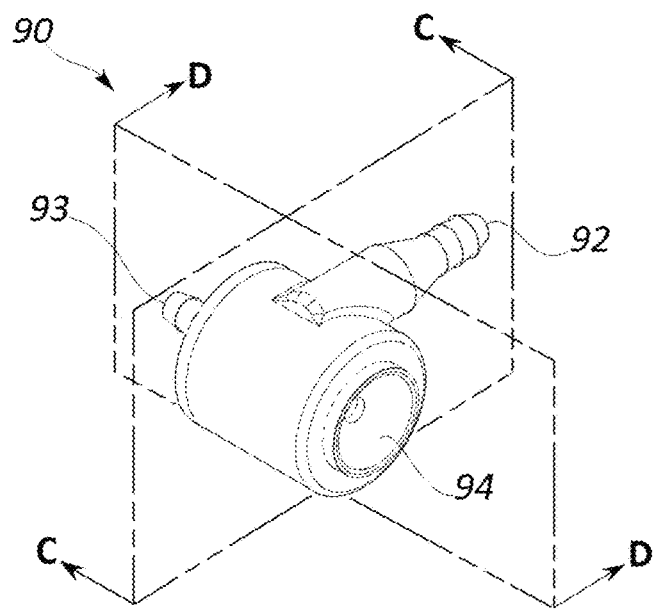
FIG. 9a shows an oblique, front left top view of a vortex oxygenator used in grow bed tubs of the invention, and defines cutting plane C-C for the oblique cross section view seen in FIG. 9b and cutting plane D-D for the oblique cross section view seen in FIG. 9c.

FIG. 9a shows an oblique, front left top view of a vortex oxygenator [90] used in grow bed tubs of the invention, and defines cutting plane C-C for the oblique cross section view seen in FIG. 9b and cutting plane D-D for the oblique cross section view seen in FIG. 9c. The vortex oxygenator further comprises an air inlet [93] having at least one annular barb and a water inlet [92] which may also include least one annular barb, and an outlet [94] with a divergent surface such as a conical nozzle as shown.

FIG. 9b shows an oblique cross section view of the vortex oxygenator of FIG. 9a taken at cutting plane C-C seen in FIG. 9a, and defines another parallel cutting plane passing through a midplane of a vortex inducing chamber of this component which is used for cross section view E-E of FIG. 9d in a first view direction and cross section view F-F of FIG. 9e in a second view direction opposite to the first view direction. The cutting plane intersects the body of the vortex oxygenator along phantom line [$f_1$.] The vortex oxygenator includes an axial air inlet [93] having at least one annular barb [b] and communicating with a mixing cavity [96] defining a vortex axis. The vortex axis is coaxial to the axis of axial air inlet [a] arrow seen in this figure. Fluid [w] is injected tangentially from water inlet [92] into an annular gallery [95] coaxial to and peripheral to the mixing cavity [96.] The water inlet may also include at least one annular barb [b] for gripping hose onto the inlet by means of hose clamps. In this cut-away view, the cutting plane intersects the interior surface of the mixing cavity along phantom line [$f_2$.] At least one injection port [97] admits water from the peripheral gallery into the mixing cavity. The injection port is angled to swirl the incoming fluid and entrain the incoming air into a vortex. Air is broken up into large numbers of small bubbles so that a large total interface surface area of fluid and air is created, allowing oxygen in the air to diffuse into the fluid. In a preferable mode of operation, the flow near the vortex axis is turbulent and the flow near the periphery of the mixing cavity is helical and laminar flow, as defined by Reynolds number calculations.

FIG. 9c shows an oblique cross section view of the vortex oxygenator of FIG. 9a taken at cutting plane D-D seen in FIG. 9a. The air inlet [93] includes at least one annular barb [b] and communicates with a mixing cavity [96] that defines a vortex axis. The vortex axis is coaxial to the axis of an axial air inlet [a] arrow seen in this figure. The fluid inlet [92] also includes at least one annular barb [b] and communicates with an annular gallery [95] peripheral to the mixing cavity. At least one injection port [97] admits fluid [w] from the peripheral gallery into the mixing cavity. The injection port is angled to swirl the incoming fluid and entrain the incoming air into a vortex.

The vortex oxygenator comprises an outlet nozzle [94] communicating with the mixing cavity [96] and comprising a convergent portion [c] connected to a divergent portion [d.] The convergent section accelerates the swirling mixture of fluid and bubbles and promotes diffusion of oxygen from the air into the fluid.

FIG. 9d shows an oblique cross section view of the vortex oxygenator of FIG. 9a taken at the cutting plane of FIG. 9b corresponding to the view direction defined by arrows E-E of FIG. 9b. Fluid under pressure enters an annular gallery [95] peripheral to and coaxial to the mixing cavity [96.] In preferable embodiments the passage from the water inlet enters the gallery at a tangent and entrains the fluid within the gallery into circular flow. A radially spaced apart plurality of injection ports [97] admit fluid from the peripheral gallery into the mixing cavity. These ports comprise an injection angle so that in concert they impart a circular or helical flow to the fluid within the mixing cavity. Air [a] entering axially into the mixing cavity is rapidly broken up into large numbers of small bubbles which swirl around within the fluid vortex. Centripetal acceleration opposes the injection forces of pressurized fluid entering the mixing chamber to further pulverize the air into tiny bubbles. The centripetal force may create a pressure drop sufficient to lower the fluid pressure to below ambient atmospheric pressure. The large surface area comprising the sum of the surface areas of the large number of small bubbles creates a large total interface surface area of fluid and air, allowing oxygen in the air to diffuse into the fluid.

FIG. 9e shows a cross section view of the vortex oxygenator of FIG. 9a taken at the cutting plane of FIG. 9b corresponding to a view direction defined by arrows F-F of FIG. 9b. The vortex oxygenator further comprises an axial air inlet [92] and a fluid inlet having at least one annular barb. Both inlets communicate with a mixing cavity defining a vortex axis and a mixing circle [M] in a plane perpendicular to the vortex axis, which in this case is the plane of this figure. Fluid [w] is admitted under pressure into an annular cavity [95] coaxial and peripheral to the mixing cavity [96.] A radially spaced apart plurality of at least one injection port [97] communicates between the annular cavity and the mixing cavity, with the inlet defining a flow axis [J] tangent to the mixing circle. In preferable embodiments such as the illustrated example, the mixing cavity defines an inner diameter [$D_1$] and the mixing circle has a diameter [$D_2$] of at least one-half of the inner diameter.

Figure 10A:
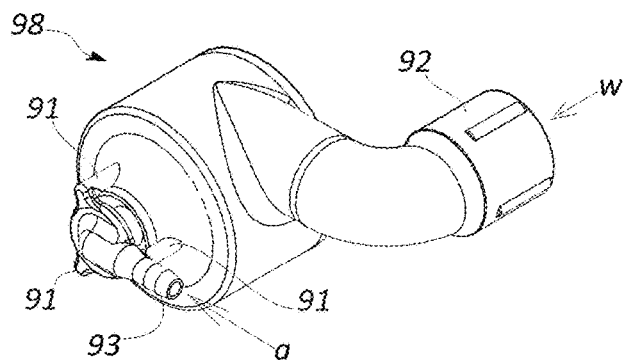
FIG. 10a shows an oblique view of an alternative embodiment of a vortex oxygenator used in grow bed tubs of the invention.

FIG. 10a shows an oblique view of an alternative embodiment [98] of a vortex oxygenator used in grow bed tubs of the invention. This version may also be used with the vertical cylindrical biofilter seen in FIG. 6a. Fluid [w] enters an inlet [92] which in this embodiment includes a threaded coupling. Air [a] enters an air inlet [93] which has a plurality of at least one barb. The air inlet directs air into the central cavity of the oxygenator in a path which includes the central axis of the central cavity. The inlet includes a central body supported by a plurality of angularly spaced apart L-shaped struts [91.]

Figure 10B:
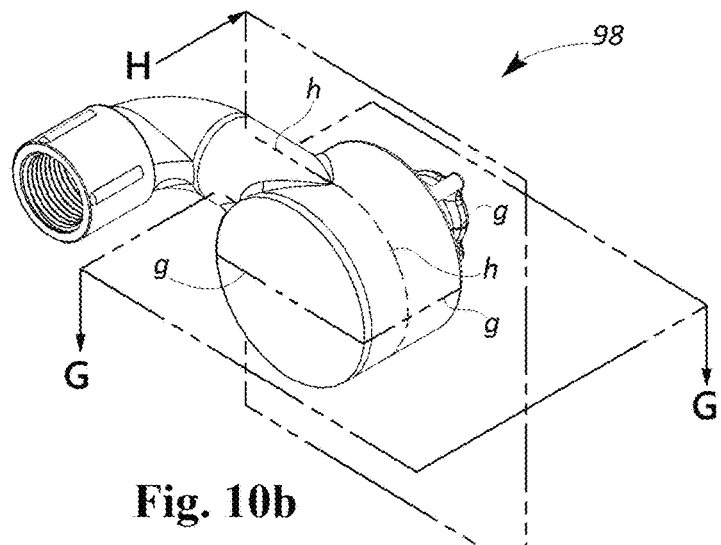
FIG. 10b shows another oblique view of the vortex oxygenator of FIG. 10a seen from an opposite end, and defines horizontal cutting plane G-G for a top view cross section FIG. 10c, and defines cutting plane H-H for an axial view cross section FIG. 10d.
Figure 10C:
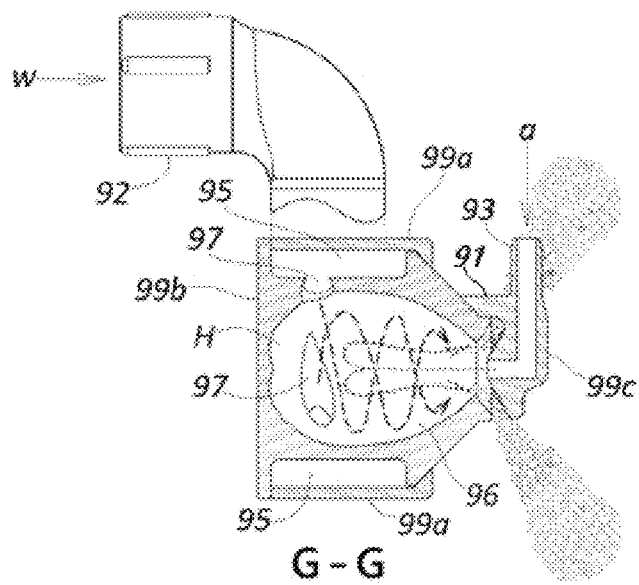
FIG. 10c shows a cross section view of the vortex oxygenator of FIG. 10a taken at cutting plane G-G defined in FIG. 10b.
Figure 10D:
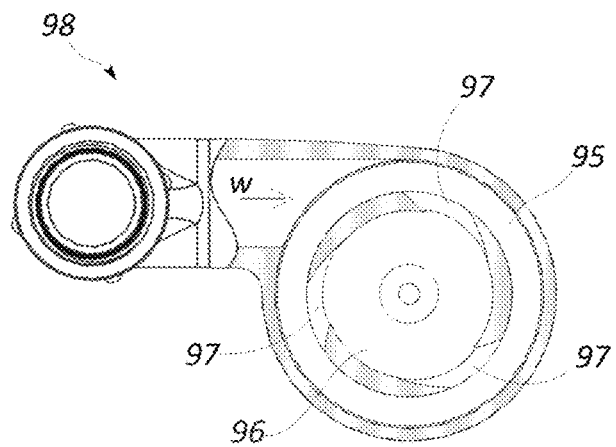
FIG. 10d shows a cross section view of the vortex oxygenator of FIG. 10a taken at cutting plane H-H defined in FIG. 10b.

FIG. 10b shows another oblique view of the vortex oxygenator [98] of FIG. 10a seen from an opposite end, and defines horizontal cutting plane G-G for a top view cross section FIG. 10c, and defines cutting plane H-H for an axial view cross section FIG. 10d. Cutting plane G-G intersects the body of the vortex oxygenator along a phantom line [g] and cutting plane H-H intersects the body of the vortex oxygenator along phantom line [h.]

FIG. 10c shows a cross section view of the vortex oxygenator of FIG. 10a taken at cutting plane G-G defined in FIG. 10b. Fluid [w] enters the fluid inlet coupling and flows into an annular gallery [95] peripheral to a mixing cavity [96.] Fluid in the gallery enters the mixing cavity through a plurality of injection ports [97] communicating between the annular gallery and the mixing cavity. In this cross section it is seen that the mixing cavity of this type of embodiment comprises a cardioid [H.] The fluid inlet [92] is shown as a broken out portion proximate the cross section of the rest of the vortex oxygenator assembly components. The exemplary component as shown is made of three bodies assembled together; an exterior shroud [99a] defining the volute of the annular gallery, a central core component [99b] defining the mixing cavity, and an air inlet body [99c] which includes a barbed fitting [93] for air to be admitted by a hose or pressur-ized line. The air inlet directs air into the central cavity of the oxygenator in a path which includes the central axis of the central cavity. The air inlet body is centrally located and supported by a plurality of angularly spaced apart L-shaped struts [91,] of which one is seen in this cross-section view. Especially if using additive manufacturing, objects having complex internal shapes and cavities may be manufactured without regard to drafts, parting lines, consumable cores, or relief and other concerns pertaining to component production by CNC machining, investment molding, injection molding or other traditional production methods.

In operation, fluid entering the mixing chamber takes on a helical flow pattern mostly along the perimeter of the cardioid cavity, as shown by the long-dash flow arrows. Air [a] is introduced into the mixing cavity close to the central axis defined by the cavity, but in a direction initially opposite the egress direction of the fluid, as shown by the finely dotted flow arrows. The counter-flow direction of the introduced air is overtaken by the swirling egress flow of the denser fluid, breaking the incoming air stream into a large quantity of small bubbles so that a large total interface surface area of fluid and air is created, allowing oxygen in the air to diffuse into the fluid. In a preferable mode of operation, the flow near the vortex axis is turbulent and the flow near the periphery of the mixing cavity is helical and laminar flow. The oxygenated fluid and residual bubbles exit the mixing cavity in a generally conical egress path proceeding from the exit orifice or nozzle.

FIG. 10d shows a cross section view of the vortex oxygenator [98] of FIG. 10a taken at cutting plane H-H defined in FIG. 10b. As explained previously for other examples of vortex oxygenators for use with the invention, fluid [w] under pressure enters an annular gallery [95] peripheral to and coaxial to the mixing cavity [96.] The passages from the fluid inlets enter the gallery at a tangent, which entrains the fluid within the gallery into circular flow. A radially spaced apart plurality of injection ports [97] admit fluid from the peripheral gallery into the mixing cavity. These ports comprise an injection angle so that in concert they impart a circular or helical flow to the fluid within the mixing cavity.

Figure 11A:
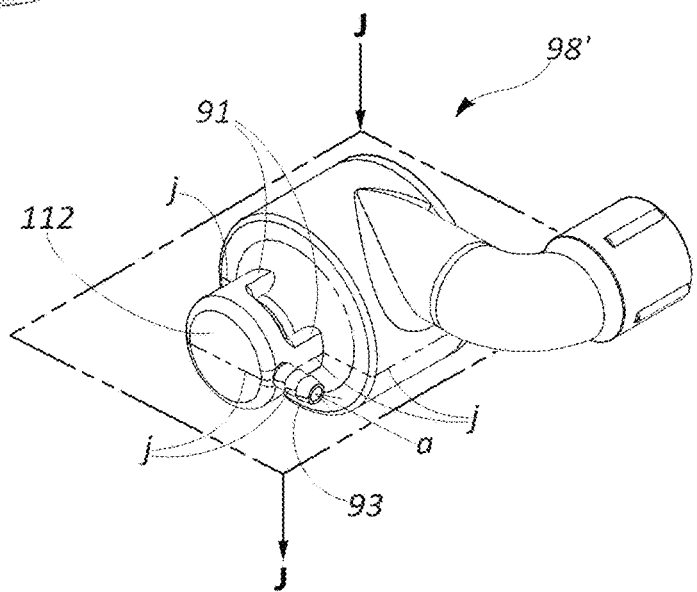
FIG. 11a shows an oblique view of yet another alternative embodiment of a vortex oxygenator used in the invention, and defines horizontal cutting plane J-J for top view cross section FIG. 11b.
Figure 11B:
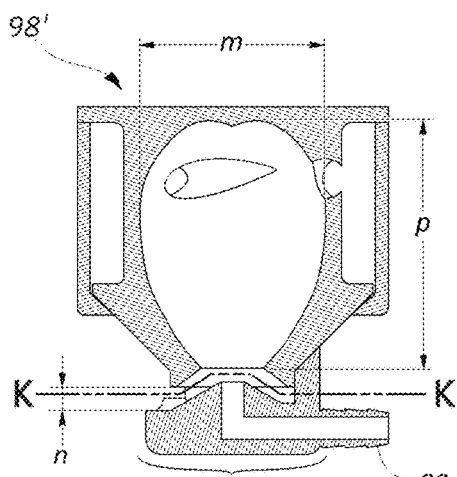
FIG. 11b shows a cross section view of the vortex oxygenator of FIG. 11a taken at cutting plane J-J defined therein, and defines offset section line K-K for the cross section view of FIG. 11c.

FIG. 11a shows an oblique view of yet another alternative embodiment of a vortex oxygenator [98'] used in the invention, and defines horizontal cutting plane J-J for a top view cross section FIG. 11b. Cutting plane J-J inter-sects the body of the vortex oxygenator along a phantom line [j.] This type of embodiment includes a spreader disk [112] spaced apart from the mixing cavity outlet. The air inlet [93] admits air [a] through a passage which directs the air axially into the mixing cavity similar to the vortex oxygenator seen in FIG. 10c. The spreader disk is fixed in position occluding the mixing chamber outlet by a plurality of struts [91.] Two or more struts may be used to support the spreader disk and in these embodiments shown and discussed three struts are employed.

With optimum tuning of the spacing between the mixing cavity outlet and the spreader disk and with other dimensions disclosed herein, the inventor has observed production of substantially increased volumes of exception-ally small bubbles as compared to other vortex oxygenators previously disclosed herein and others currently available. Optimum tuning may be arrived at for a vortex oxygenator by using a 3D printer to produce a vortex oxygenator in proportion to the figures herein, and then producing a succession in which one dimension at a time is varied, and in testing and observing the latest instance compared to the previous instance. When improvement is observed, the dimensions of the latest device are retained and the dimension under test is varied by another increment until performance is observed to deteriorate. In that case, the dimension under test may be incremented by half the variance and a new "latest version" produced by 3D printing and compared to the "last known best" version, until the change in performance between "last known best" and "latest version" is not seen as significant. While the costs of 3D printing of objects on the order of 6 inches cubed and smaller continue to decrease, with an affordable test regimen, an optimally tuned product may be arrived at without undue experimentation, such as with 40 optimizing trials or fewer. An optimally tuned vortex oxygenator creates vacuum in the central axial portion of the mixing cavity. Vacuum pressure may be measured as a negative quantity, being the absolute pressure within the mixing cavity minus the absolute pressure at ambient conditions outside the vortex oxygenator.

Figure 11C:
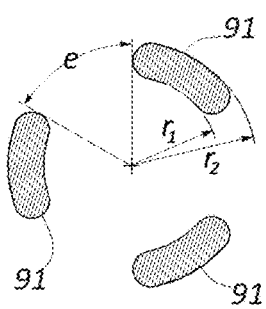
FIG. 11c shows a cross section view the alternative embodiment of a vortex oxygenator shown in FIG. 11a, taken at the offset section line K-K defined n FIG. 11b.

FIG. 11b shows a cross section view of the vortex oxygenator [98'] of FIG. 11a taken at cutting plane J-J defined therein, and defining offset section line K-K for the cross section view of FIG. 11c. The air inlet [93] is incorporated into the spreader disk [112] as a passage leading to the central axis of the mixing cavity and turning coaxial to the cavity so as to inject air into the center of the fluid vortex when operating, which is also where the absolute pressure of fluid in the device will be lowest. This figure also includes three dimensions, two pertaining to the mixing cavity and one of four dimensions pertaining to the spreader disk, which may be varied to produce an optimized vortex oxygenator in accordance with the invention.

In one instance of an optimized vortex oxygenator, the diameter [m] of the ovoid cavity at its greatest extent may range inclusively between about 1.125 inches and about 2.25 inches, and in a best mode resides at about 1.48 inches in diameter. Also in this instance the axial length [p] may range inclusively between about 1.5 inches and about 2.5 inches and in a best mode resides at about 1.98 inches. The distance [n] from the exit orifice of the mixing cavity and the spreader disk acts as a choke, and by experimentation for a vortex oxygenator having cavity dimensions as disclosed herein, this distance may range inclusively from about 0.15 inches to about 0.44 inches, with optimal performance being observed at about 0.193 inches. In the optimal performance as observed, the bubbles may be so fine as to appear as a smoky mist dissipating from the vortex oxygenator.

FIG. 11c shows a cross section view the alternative embodiment of a vortex oxygenator shown in FIG. 11a, taken at the offset section line K-K defined n FIG. 11b. In this figure the relationships between the inner and outer radii of the struts [91] and the fraction of the circular periphery which exists as open exit arcs are discussed. In preferable arrangements the number of struts is divided by 360° to arrive at a radially symmetric arrangement of the struts, so that with three struts these are deployed 120° apart. Two struts would be deployed at 180° apart, four struts would be deployed at 90° apart, five struts would be deployed at 72° apart, etc. Each strut is preferably arcuate with an arcuate inner surface of radius $[r_1]$ and an effective thickness to define a cross section of the sum of the struts sufficient to withstand the egress pressure of the bubbly fluid exiting the mixing cavity of the vortex oxygenator. For embodiments having struts with an arcuate exterior, the radius of the outer surface of the strut is $[r_2]$. In preferable embodiments, the struts may be as small as a circular rod tangent to both the inner and outer radii.

In preferable embodiments in accordance with the invention and in accordance with dimensions [m,] [n,] and [p] as defined previously, the inner radius $[r_1]$ resides at about 0.5 inches and the outer radius $[r_2]$ resides at about 0.7 inches. A best mode operation was observed with the three exits [e] disposed between the struts each subtending 60° arcs. With these dimensions, a practical minimum strut size is found with the struts being round rods of 0.2 inches diameter each and the resulting exits each subtend-ing 103° arcs. In determining and optimizing these six dimensions explained in FIGS. 11b and 11c, fractional factorial methods may be employed to design an experiment regimen which arrives at a dimensionally optimized unit without undue experimentation, especially given the low prototyping costs and the rapidity of generating a success-sion of trial sizes and shapes by using 3D printing.

Figure 12:
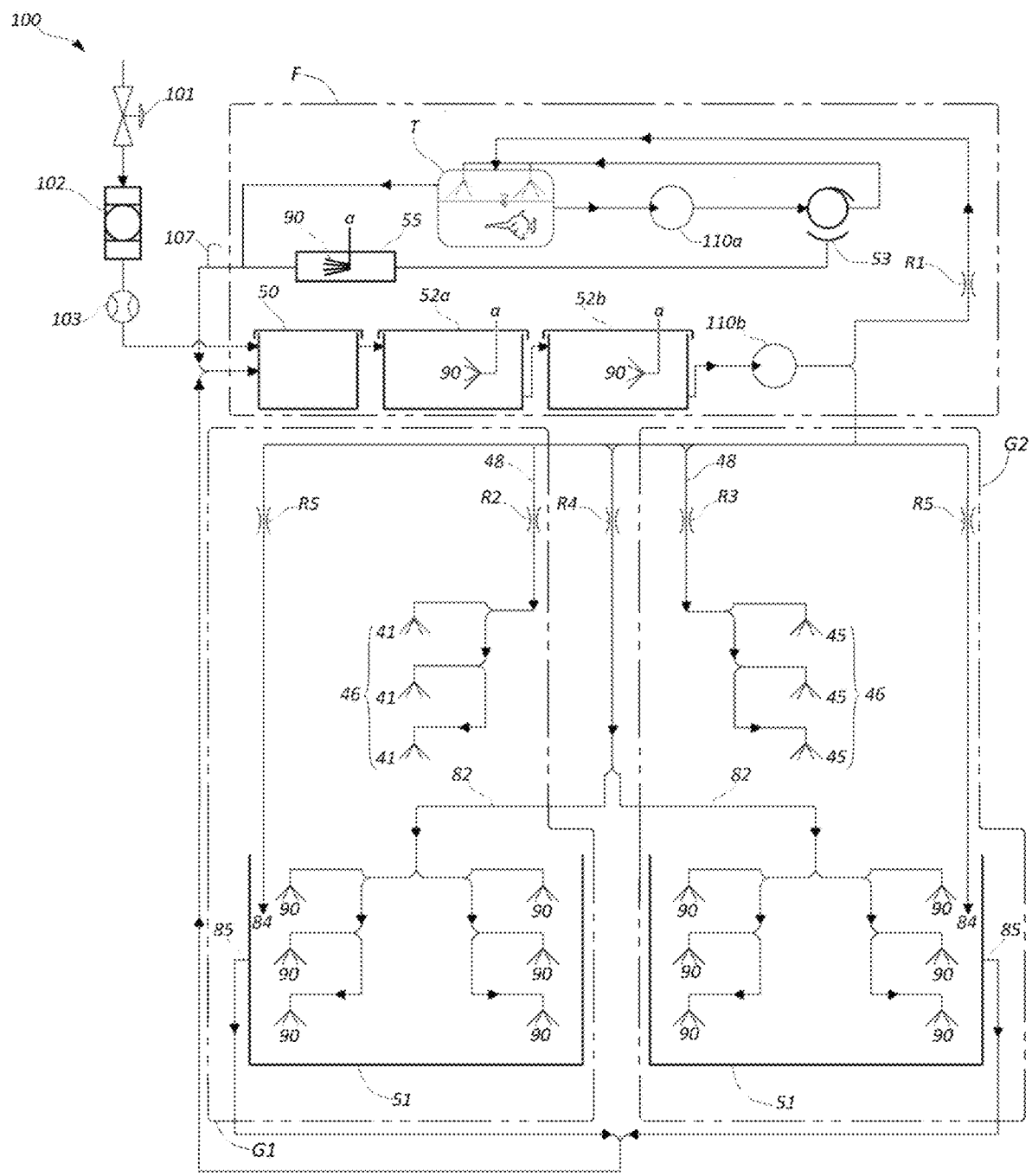
FIG. 12 shows a schematic diagram of an aquaponics system in accordance with the invention.

FIG. 12 shows a schematic diagram of an aquaponics system [100] in accordance with the invention. Most of the components may be grouped into three subassemblies: a fish tank subassembly [F] and two grow subassemblies [G1] and [G2.] The fish tank subassembly includes a fish tank [T] for containing fluid and at least one fish.

Fluid connections are shown as solid lines in this figure and the subassemblies are bounded by phantom lines. Air supply lines are not shown in this figure. A first pump [110a] is hydraulically connected from the fish tank drain outlet to a cyclone filter [53] having a clarified fluid outlet and a cyclone filter sludge outlet. The clarified fluid outlet is hydraulically connected to return clarified fluid to the fish tank. The sludge outlet passes heavier effluent through a biofilter [55] fitted with a vortex oxygenator [56a] as seen in FIG. 6a and then to a sludge tank [50.] The plumbing between this biofilter and the sludge tank may include a vent [107] to atmosphere to prevent buildup of waste gas within the sludge tank. An outlet from the sludge tank passes through a series of at least one biofilter tank. In this exemplary diagram, the series contains two biofilters [52a] and [52b.]

A second pump [110b] delivers nutrient fluid from the last of the series of at least one biofilter tank to risers [48] leading to at least one irrigation line [46] positioned over the smaller grow towers [41] of the first grow subassembly and risers to the larger towers [45] of the second grow subassembly. A plurality of at least one vortex oxygenator [90] are each pneumatically connected to a pressurized air [a] source and a nutrient fluid source, wherein at least a first vortex oxygenator from among the plurality is deposited within a grow bed tub, and wherein the overflow outlet [85] of the tub is hydraulically connected to the sludge tank and from there to any one from among the series of at least one biofilter. As shown in the figure, at least a portion of the overflow from the grow bed tubs may be returned to the sludge tank.

Thus, unlike conventional systems, the inventive aquaponic system within the enclosure as shown and described comprises several flow loops operating concurrently. It is within the scope of the invention to include cutoff valves or flow restrictors so that individual flow loops may be throttled or the relative volumes of flows may be balanced. Flow rate or velocity metering devices may be included which electronically transmit flow data to the controller which may then be remotely retrievable to a user's smart phone or computer. Similarly, at least some of the valves may be solenoid valves electronically connected to the controller and controllable by remote command.

Examining the flow loops, a first flow loop proceeds from the fish tank drain outlet to the first pump, to the cyclone filter, and from the clarified fluid outlet of the cyclone filter to the fish tank. A second flow loop proceeds from the fish tank drain outlet to the first pump, to the cyclone filter, and from the sludge outlet of the cyclone filter to a biofilter which is a bio tower [55] that comprises a vertical cylindrical tank and a second [56a of FIG. 6a] from among the plurality of vortex oxygenators, and from the bio tower to the sludge tank, from the sludge tank through the series of at least one biofilter tank, from the last of the series of at least one biofilter tank to a second pump [110b,] and from the second pump to the fish tank. Other vortex oxygenators [90] are located within the biofilter tanks downstream of the sludge tank.

A third flow loop proceeds from an overflow outlet of the fish tank to the sludge tank, from the sludge tank through the series of at least one biofilter tank, from the last of the series of at least one biofilter tank to the second pump, and from the second pump to the fish tank. A fourth flow loop proceeds from the last of the series of at least one biofilter tank to the second pump, from the second pump through an irrigation line [46] above a grow bed tower ([41] or [45,]) and from the overflow outlet from the grow bed tub to the sludge tank and then to a first and to a last of the series of the at least one biofilter tank. A fifth flow loop proceeds from the last of the series of at least one biofilter tank to the second pump, from the second pump to the drain of the grow bed tub (as an inlet,) or by inlet plumbing [84,] and from the overflow outlet from the grow bed tub to the sludge tank.

In preferable embodiments within the scope of the invention, the second flow loop of the aquaponic system includes comprises a flow restrictor [R1] between the second pump and the fish tank. According to other optional configurations not exclusive of the previous, the fourth flow loop may include a flow restrictor [R2] or [R3] between the second pump and an irrigation line [46.] According to yet other optional configurations not exclusive of the previous, the fifth flow loop may include at least one flow restrictor [R4] between the second pump and at least one oxygenator in a grow bed tub [51,] or at least one flow restrictor [R5] between the second pump and a grow bed tub fill inlet [84.]

In comparison to other previous inventions, Nelson et al in U.S. Pat. No. 8,677,686 has only two concurrent flow loops, both of which pass through a "degassing tank" [Item 4 of FIG. 1 in '686,] which is a component not required and not included in the inventive system because of the superior operation of vortex oxygenators of the present invention. Furthermore, the primary objective of the '686 invention is to provide a soil-less aquaponic system, which is a condition not required by the present invention. A similar system is presented by Nelson et al in U.S. Pat. No. 9,232,702 which also requires a degassing tank and has only two flow loops and proposes both soil-less and soil-filled grow beds, and both the '686 and the '702 place hydroponically growing plants on rafts which as compared to cylindrical grow towers of the invention are not at all conducive to sidereal rotation, differential exposure of plants to sun versus shade, or other ease-of-access advantages of cylindrical grow towers as described herein. The plurality of cylindrical grow towers of the present invention may provide a larger number of plants in production than the number of floating rafts able to be positioned in favorable sunlight. Also, neither of the Nelson et al inventions deploy retractable reflective sheets within the enclosure.

Due to evaporation and uptake into the structures of the plants and the bodies of the growing organisms in the system, from time to time make-up water may be required to top off fluid levels within the system. It may be convenient to plumb in municipal water to the system, such as from a garden hose if the enclosure is situated in an urban or suburban setting. The make-up water inlet would preferably include a fill valve [101.] The fill valve, like other valves in the system plumbing, may be manually operated or may be solenoid controlled and electrically connected to the system controller, thereby also enabling options for remote operation, and command by a smartphone user. A flow meter [103] or visual feedback by camera to a remote user may be used to determine when to open and close the fill valve. Lastly, since municipal water is usually treated with bactericides, as with aquarium practice, preferably these are neutralized before the water may be introduced into the nutrient fluid system. A filter [102] that may include carbon or a reverse osmosis system, or which is a chlorine filter may be preferably included at this system entry point for incoming water.

In summary, the enclosure for an aquaponic system which implements automatic shading for temperature and sunlight intensity control and having five concurrent circulation paths for wastes to be metabolized from nitrites to nitrates for uptake into valuable or edible plants provides extraordinary benefits: accelerating plant growth and increasing the nutrient density of foodstuffs harvested from plants using this system, extending available growing seasons, enabling the benefits of home gardening in places where it is often challenging, such as urban or less arable environments, and enabling remote monitoring and management of aquaponic processes. The system may help people resist the effects of climate change, such as in currently populated regions where past and present climate may sustain the people but which under future climates may become inarable or otherwise confine the people to an exiguous existence on the land.

While certain features and aspects have been described with respect to exemplary embodiments, one skilled in the art will recognize that numerous modifications are possible. Also, while certain functionality is ascribed to certain system components, unless the context dictates otherwise, this functionality may be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Furthermore, the procedures described with respect to one method or process may be incorporated within other described methods or processes; likewise, system components described according to a particular structural configuration and/or with respect to one system may be organized in alternative structural configurations and/or incorporated within other described systems.

The present disclosure is not to be limited in terms of the particular embodiments described in this application, which are intended as illustrations of various aspects. Many modifications and variations may be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

Hence, while various embodiments are described with or without certain features for ease of description and to illustrate exemplary aspects of those embodiments, the various components and/or features described herein with respect to a particular embodiment may be substituted, added, and/or subtracted from among other described embodiments, unless the context dictates otherwise. Thus, unauthorized instances of apparatuses and methods claimed herein are to be considered infringing, no matter where in the world they are advertised, sold, offered for sale, used, possessed, or performed.

Consequently and in summary, although many exemplary embodiments are described above, it will be appreciated that the invention is intended to cover all modifications and equivalents within the scope of the following claims.

What is claimed is:

1. An aquaponic system comprising
a controller,
a growing enclosure having a roof and at least a first perimeter wall and a second perimeter wall each comprising a transparent material, with said first perimeter wall substantially parallel to said second perimeter wall,
a motor-driven spindle deposited between an upper edge of said first perimeter wall and an upper edge of said second perimeter wall and having an axis of rotation substantially parallel to at least one from among said first and second perimeter walls,
a first sheet of reflective material affixed to said spindle such that in an at least partially unwound condition said first sheet passes over a first fairlead spindle to reside proximate to and substantially parallel to an interior surface of said first perimeter wall,
a second sheet of reflective material affixed to said spindle such that in said at least partially unwound condition said second sheet passes over a second fairlead spindle to reside proximate to and substantially parallel to an interior surface of said second perimeter wall,
a fish tank for containing fluid and at least one fish and comprising
a floor having a surface proximate to
a drainage groove and
a fish tank drain outlet proximal to an end of said drainage groove,
a first pump hydraulically connected from said fish tank drain outlet to a cyclone filter having a clarified fluid outlet and a cyclone filter sludge outlet, with said clarified fluid outlet hydraulically connected to return clarified fluid to said fish tank,
a sludge tank hydraulically connected from said cyclone filter sludge outlet to a series of at least one biofilter tank,
a second pump for delivering nutrient fluid from the last of said series of at least one biofilter tank to at least one irrigation line,
at least one grow subassembly deposited beneath said at least one irrigation line, said grow subassembly comprising at least one substantially vertical hollow cylinder having a plurality of radial apertures and deposited above a grow bed,
said grow bed comprising a tub having a tub inlet and an overflow outlet, and
a plurality of at least one vortex oxygenator each pneumatically connected to a pressurized air source and a nutrient fluid source, wherein at least a first vortex oxygenator from among said plurality is deposited within said tub, and wherein said overflow outlet of said tub is hydraulically connected to said sludge tank.

2. The aquaponic system of claim 1, wherein said plurality of radial apertures of said hollow cylinder reside within an axially stacked series of rings each having a radial array of apertures.

3. The aquaponic system of claim 1, further comprising at least one bed tube passing through any one from among said plurality of radial apertures, with said bed tube comprising two opposed outlets and an arcuate portion between said opposed outlets, with a first of said two outlets residing outside said hollow cylinder, a second of said two outlets residing within said hollow cylinder, and with said arcuate portion oriented to form a fluid collection basin.

4. The aquaponic system of claim 1, further comprising at least one bed tube passing through any one from among said plurality of radial apertures, with said bed tube further comprising a fluid absorbent material.

5. The aquaponic system of claim 1, wherein hydraulic connections among its components comprise
a first flow loop from said fish tank drain outlet to said first pump, to said cyclone filter, and from said clarified fluid outlet of said cyclone filter to said fish tank,
a second flow loop from said fish tank drain outlet to said first pump, to said cyclone filter, and from said sludge outlet of said cyclone filter to a bio tower which comprises a vertical cylindrical tank and a second from among said plurality of vortex oxygenators, and from said bio tower to said sludge tank, from said sludge tank through said series of at least one biofilter tank, from the last of said series of at least one biofilter tank to a second pump, and from said second pump to said fish tank,
a third flow loop from an overflow outlet of said fish tank to said sludge tank, from said sludge tank through said series of at least one biofilter tank, from the last of said series of at least one biofilter tank to said second pump, from said second pump to said fish tank,
a fourth flow loop from the last of said series of at least one biofilter tank to said second pump, from said second pump through an irrigation line above a grow bed, and from said overflow outlet from said grow bed tub to said sludge tank, and from said sludge tank to a first of said series of said at least one biofilter tank, and
a fifth flow loop from the last of said series of at least one biofilter tank to said second pump, from said second pump to said inlet of said grow bed tub, and from said overflow outlet from said grow bed tub to said sludge tank, and from said sludge tank to a first of said series of said at least one biofilter tank.

6. The aquaponic system of claim 5, wherein said second flow loop further comprises a flow restrictor between said second pump and said fish tank.

7. The aquaponic system of claim 5, wherein said fourth flow loop further comprises a flow restrictor between said second pump and said irrigation line.

8. The aquaponic system of claim 5, wherein said fifth flow loop further comprises a flow restrictor between said second pump and said grow bed tub.

9. The aquaponic system of claim 1, wherein in an at least partially wound condition a portion of said first sheet of reflective material is wound around said motor-driven spindle and a portion of said second sheet of reflective material is also wound around said motor-driven spindle, so that a radial succession layers of wound materials on said motor-driven spindle comprise alternating layers of said first sheet of reflective material and said second sheet of reflective material.

10. The aquaponic system of claim 1, wherein a motor coupled to said motor-driven spindle is operably connected to said controller and a temperature sensor is also operably connected to said controller so that when a predetermined temperature is sensed, said controller energizes said motor to rotate said motor-driven spindle.

11. The aquaponic system of claim 1, wherein a motor coupled to said motor-driven spindle is operably connected to said controller and a photosensor is also operably connected to said controller so that when a predetermined light intensity is sensed, said controller energizes said motor to rotate said motor-driven spindle.

12. The aquaponic system of claim 1, wherein a motor coupled to said motor-driven spindle is operably connected to said controller and a clock is also operably connected to said controller so that at a predetermined time said controller energizes said motor to rotate said motor-driven spindle.

13. The aquaponic system of claim 1, wherein any one from among said plurality of vortex oxygenators further comprises
an air inlet having at least one annular barb and communicating with a mixing cavity defining a vortex axis and a mixing circle in a plane perpendicular to said vortex axis,
an annular cavity coaxial and peripheral to said mixing cavity, and
at least one inlet communicating between said annular cavity and said mixing cavity, with said inlet defining a flow axis tangent to said mixing circle.

14. The aquaponic system of claim 13, wherein said mixing cavity defines an inner diameter and said mixing circle has a diameter of at least one-half of said inner diameter.

15. The aquaponic system of claim 13, wherein said vortex oxygenator comprises an outlet nozzle communicating with said mixing cavity and comprising a convergent portion connected to a divergent portion.

16. The aquaponic system of claim 13, wherein a cross section of said mixing cavity comprises a cardioid.

17. The aquaponic system of claim 1, wherein said growing enclosure further comprises a tow point.

* * * * *